(12) United States Patent
Ge et al.

(10) Patent No.: US 10,804,985 B2
(45) Date of Patent: Oct. 13, 2020

(54) ELECTRONIC DEVICE AND COMMUNICATION METHOD

(71) Applicant: Sony Corporation, Tokyo (JP)

(72) Inventors: Ning Ge, Beijing (CN); Zhengyi Zhou, Beijing (CN); Peiyao Zhao, Beijing (CN); Zhaocheng Wang, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/495,111

(22) PCT Filed: May 11, 2018

(86) PCT No.: PCT/CN2018/086567
§ 371 (c)(1),
(2) Date: Sep. 18, 2019

(87) PCT Pub. No.: WO2018/210193
PCT Pub. Date: Nov. 22, 2018

(65) Prior Publication Data
US 2020/0021342 A1 Jan. 16, 2020

(30) Foreign Application Priority Data

May 17, 2017 (CN) .......................... 2017 1 0350196

(51) Int. Cl.
*H04B 7/0456* (2017.01)
*H04B 7/06* (2006.01)
(52) U.S. Cl.
CPC ......... *H04B 7/0456* (2013.01); *H04B 7/0617* (2013.01)
(58) Field of Classification Search
CPC .................................................. H04B 7/0456
(Continued)

(56) References Cited

U.S. PATENT DOCUMENTS

2002/0033768 A1* 3/2002 Neeman ............... H01Q 3/38
342/372
2013/0039401 A1* 2/2013 Han ................... H04B 7/0617
375/222
(Continued)

FOREIGN PATENT DOCUMENTS

CN 104779442 A 7/2015
CN 105721033 A 6/2016
(Continued)

OTHER PUBLICATIONS

International Search Report and Written Opinion dated Jul. 24, 2018 for PCT/CN2018/086567 filed on May 11, 2018, 9 pages including English Translation of the International Search Report.
(Continued)

*Primary Examiner* — Lihong Yu
(74) *Attorney, Agent, or Firm* — Xsensus LLP

(57) ABSTRACT

The present disclosure relates to an electronic device and communication method. The electronic device comprising a RF link unit radiating a data stream in form of electromagnetic wave radiation onto a phase shifter; a processing circuitry configured to determine an analog precoding matrix; phase shifters, each of which for performing analog precoding on the received signal of the electromagnetic wave radiation according to the determined analog precoding matrix, and an antenna array, each of antenna elements of which transmits the analog precoded signal, wherein the number of the phase shifters is the same as the number of the antenna elements of the antenna array, and the phase shifters and the antenna elements are in one-to-one correspondence.

19 Claims, 10 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2013/0286960 A1* | 10/2013 | Li | H04B 7/0684 370/329 |
| 2015/0222336 A1* | 8/2015 | Yilmaz | H04B 7/024 370/252 |
| 2016/0080051 A1* | 3/2016 | Sajadieh | H04B 7/0639 375/267 |
| 2016/0344463 A1* | 11/2016 | Kim | H04W 16/28 |

FOREIGN PATENT DOCUMENTS

| | | |
|---|---|---|
| CN | 106450789 A | 2/2017 |
| WO | 2016/114696 A1 | 7/2016 |

OTHER PUBLICATIONS

Zhou et al., "Hardware-Efficient Hybrid Precoding for Millimeter Wave Systems with Multi-Feed Reflectarrays", IEEE Access, vol. 6, Jan. 15, 2018, pp. 6795-6806.

* cited by examiner

ELECTRONIC DEVICE AND COMMUNICATION METHOD

CROSS REFERENCE TO RELATED APPLICATIONS

The present application is based on PCT filing PCT/CN2018/086567, filed May 11, 2018, which claims the priority of Chinese Patent Application No. 201710350196.0, filed on May 17, 2017, the disclosure of each is incorporated herein by reference in its entirety as a part of the present application.

TECHNICAL FIELD

The present disclosure relates to an electronic device and a communication method, and in particular, to an electronic device and a communication method using a multi-feeder reconfigurable reflective array antenna.

BACKGROUND ART

As one of key technologies of the future 5G, Millimeter Wave technology has attracted extensive attention of the industry in recent years. The Millimeter Wave technology, on one hand, provides a wealth of available spectrum resources, but on the other hand, faces a problem of strong attenuation due to high frequency band. Fortunately, due to short wavelengths of the millimeter wave, according to the antenna theory, the size of antennas for the millimeter wave system is correspondingly small and easy to be integrated, so that hundreds of antennas may be placed in a small space to form a large-scale antenna array to achieve an effect of directional power enhancement by using a beamforming technology. In addition, the beamforming technology based on the antenna array may also support space division multiple access, resulting in a huge increase in capacity even in a multi-user scenario.

Currently, there is a technique for precoding user data to obtain an array gain before transmitting the user data via the antenna array. Conventional all-digital precoding architecture requires one-to-one correspondence between radio frequency (RF) links and antenna elements, however, in case of a large-scale antenna array, its power consumption and hardware complexity become unacceptable, so hybrid precoding architecture emerges. The hybrid precoding architecture is advantageous in the power consumption and hardware complexity. The hybrid precoding architecture performs digital precoding in baseband and performs analog precoding at a transmitting end with phase shifters, so that the number of RF links required by the precoding may be greatly reduced at the transmitting end with little performance loss.

SUMMARY OF THE INVENTION

Antenna based on a phased array has been known. There are two kinds of hybrid precoding architectures for the phased array antenna, one is fully connected and the other is partially connected. Both require constructing a complex signal transmission line, such as a feeding network, between the RF links and the antenna elements to transmit data streams to corresponding antenna elements.

FIG. 1A shows a schematic diagram of a fully-connected hybrid precoding architecture for the phased array antenna. As shown in FIG. 1A, in case of a single-cell multi-user millimeter-wave antenna array system, M antennas (i.e., the phased array antenna has M antenna elements) are provided on the base station side, K data streams for K users are subjected to digital precoding in the baseband by using a digital precoding matrix, and the digital-precoded K data streams are transmitted to N RF links. In the fully connected architecture, each RF link is connected to all antennas, and phase shifters are provided on all of these K×M connections. According to the analog precoding matrix F, the phase shifters performs phase shifting on the respective signals from the RF links, i.e., performs the analog precoding. The signals from respective RF links are combined into M signals by combiners after the analog precoding (the phase shifting), transported to the corresponding antennas, and transmitted by the antennas. In the fully connected architecture, a total of K splitters, K×M phase shifters, and M combiners are required.

FIG. 1B shows a schematic diagram of a partially connected hybrid precoding architecture for the phased array antenna. Compared with the fully connected architecture shown in FIG. 1A, in the partially connected architecture, each RF link is connected to M/K antennas, that is, each antenna is connected to one RF link, as shown in FIG. 1B. Therefore, in the partially connected architecture, a total of K splitters and M phase shifters are required without the need for any combiner.

Although the conventional hybrid precoding architecture for the phased array antenna has certain advantages over the all-digital precoding architecture in terms of power consumption, cost, hardware complexity and the like, there are still some shortcomings. For example, the transmission of a signal from the RF link to the antennas depends on the construction of a transmission line such as a feeding network, on one hand, the signal experiences a significant power attenuation in the transmission line, and on the other hand, the construction of the transmission line and the use of phase shifters and/or combiners may greatly increase the hardware complexity in a large-scale antenna array, and thus the cost burden becomes heavier.

In order to solve the above-mentioned technical deficiencies, the present disclosure proposes an electronic device and a communication method using a reflective array antenna.

According to an aspect of the present disclosure, there is provided an electronic device comprising a RF link unit radiating a data stream in a form of electromagnetic wave radiation onto a phase shifter; a processing circuitry configured to determine an analog precoding matrix; phase shifters, each of which for analog precoding the received signal of the electromagnetic wave radiation according to the determined analog precoding matrix, and an antenna array, each of antenna elements of which transmits the analog precoded signal, the number of the phase shifters being the same as the number of the antenna elements of the antenna array, and the phase shifters and the antenna elements are in one-to-one correspondence.

According to another aspect of the present disclosure, there is provided a communication method comprising radiating, by a RF link unit, a data stream in form of electromagnetic wave radiation onto a phase shifter; determining, by a processing circuitry, an analog precoding matrix; analog precoding, by the phase shifter, the received signal of the electromagnetic wave radiation according to the determined analog precoding matrix; and transmitting, by an antenna array, the analog precoded signal, the number of the phase shifters being the same as the number of antenna elements of the antenna array, and the phase shifters and the antenna elements are in one-to-one correspondence.

Yet another aspect of the present disclosure relates to a computer readable storage medium storing instructions thereon for implementing the foregoing communication method when loaded and executed by a processor.

Advantageous effects of reducing power consumption and hardware complexity and saving cost may be achieved by various aspects according to the present disclosure as compared with the conventional phased array antenna.

BRIEF DESCRIPTION OF THE DRAWINGS

A better understanding of the present disclosure may be achieved by referring to a detailed description given hereinafter in connection with accompanying figures, where the same or similar reference signs are used to indicate the same or similar components throughout the figures. The figures are included in the specification and form a part of the specification along with the following detailed descriptions, for further illustrating embodiments of the present disclosure and for explaining the theory and advantages of the present disclosure. Wherein.

Figure 1A:
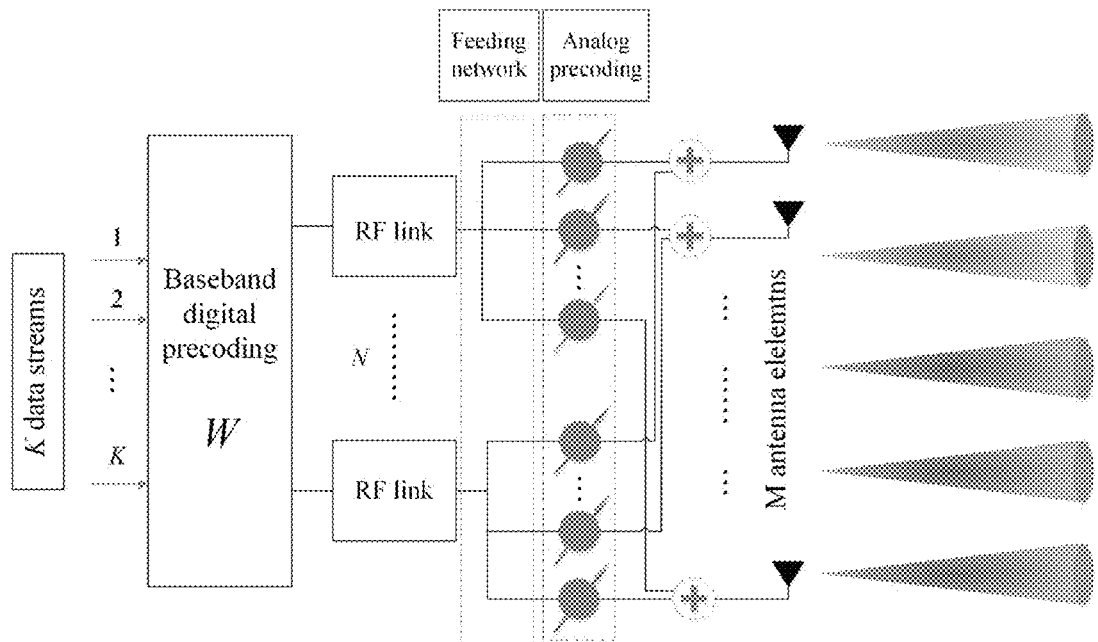
FIGS. 1A and 1B are schematic diagrams showing the fully-connected and partially-connected hybrid precoding architectures of the phased array antenna in prior arts.

Further features of the present invention will become apparent from the following description of exemplary embodiments with reference to the attached drawings.

DESCRIPTION OF EMBODIMENTS

The illustrative embodiments of the invention will be described hereinafter with reference to the drawings. For purpose of clarity and simplicity, not all features are described in the specification. Note that, however, many settings specific to the implementations may be made in implementing the invention according specific requirements, so as to achieve specific goals of the developers, for example, to comply with the limiting conditions related to apparatus and service, which vary from one implementation to another.

In addition, it should be noted that for purposed of preventing the present disclosure from being obsesured by unnecessary details, the figures illustrate only steps of a process and/or components of a device that are closely related to the technical solutions of the invention, and omit other details that are in little relation to the invention.

In the present disclosure, various specific terms are used for convenience of description. It should be noted, however, that the terms should be interpreted in a broad sense. Although the terms used in the present disclosure have other names or definitions in different technologies or application scenarios, those skilled in the art will appreciate that the terms used in the present disclosure are intended to cover them based on the following description.

Embodiments of the present disclosure will be described below with reference to the drawings. The drawings illustrate aspects of a preferred embodiment of the present disclosure, but the number, size, shape and the like of the various elements in the drawings are merely exemplary and should not be construed as limiting the scope of the disclosure.

1. Electronic Device According to an Embodiment of the Present Disclosure

Figure 2:
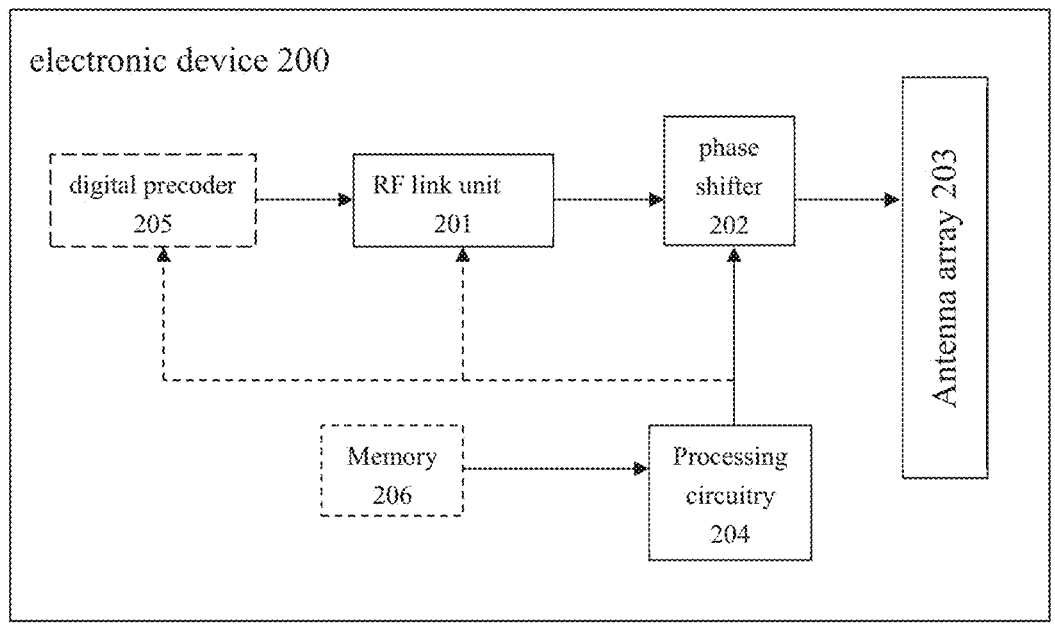
FIG. 2 is a block diagram showing an electronic device according to an embodiment of the present disclosure.

FIG. 2 is a block diagram showing an electronic device 200 according to an embodiment of the present disclosure. The electronic device 200 may be located in various control devices or transmitting means. The control device referred to herein is, for example, a base station such as an eNB or a gNB under the 5G communication standard of 3GPP, a remote radio head, a wireless access point or the like, and the transmitting means includes, for example, a large-sized vehicle-mounted transmitting means or a fixed transmitting means (for example, a drone management tower).

As shown in FIG. 2, the electronic device 200 includes at least RF link units 201, phase shifters 202, an antenna array 203, and a processing circuitry 204, which are drawn in solid lines.

The RF link units 201 may be configured to radiate data streams representing baseband user data to the phase shifters 202 in form of electromagnetic wave radiation. The number N of the RF link units 201 is preferably a plurality, for example, N>1. In an example, it is assumed that the number N of the RF link units 201 and the number K of the data streams (presumably K>1) are equal, that is, N=K, and one RF link unit 201 corresponds to one data stream. In another example, the number N of the radio link units 201 may be greater than the number K of the data streams. These K data streams may belong to K users, or some of them may belong to the same user or even all belong to one user. In the hybrid precoding architecture, the data streams are mapped onto the radio link units 201 possibly after digital precoding by a digital precoder. The RF link units 201 may include a component that up-converts a signal representing the data stream and a component (an electromagnetic wave radiation end, or a feeder) that converts the up-converted signal into the electromagnetic wave radiation and is connected to the former component. For example, the RF link units 201 may upconvert the signal to a carrier frequency and further convert it to an electromagnetic wave radiation signal at the electromagnetic wave radiating end. The electromagnetic wave radiation signal is then radiated toward the antenna array to serve as a feeder for the reflective array antenna. As used herein, "radiating" means there is no physical connection such as a feed network between the RF link and the antenna array, and the electromagnetic wave signal (RF signal) is directly emitted (radiated) to the antenna array via an intermediate air medium over a distance equivalent to the size of the antenna array.

The phase shifters 202 may be configured to receive an electromagnetic wave signal radiated from the electromagnetic wave radiation end of the respective RF link unit 201, and performs analog precoding (phase shifting in this embodiment) on the received electromagnetic wave radiation signal according to an analog precoding matrix determined by the processing circuitry 204 (the determination process will be described in detail later in Section 5). The phase shifters 202 may be arranged at the antenna elements of the antenna array 203 and in one-to-one correspondency with the antenna elements. The phase shifter 202 and the antenna element may be separate components or an integrated component. Preferably, for example, the antenna array may function as the phase shifters, and the phase shifter 202 has a function of receiving the electromagnetic wave signal on a side facing the electromagnetic wave radiation end of the respective RF link unit 201. As will be described in detail below with reference to FIGS. 4A-5B, each phase shifter 202 may receive electromagnetic wave radiation signals from a plurality of RF link units under a fully radiated architecture, and may receive an electromagnetic wave radiation signal from a single RF link unit under a partially radiated architecture. Then, based on respective elements in the analog precoding matrix determined by processing circuitry 204, each phase shifter 202 may phase shift the received electromagnetic wave signals to effect the analog precoding.

The antenna array 203 includes a plurality of antenna elements arranged in a specific pattern. In an example, the antenna elements on the antenna array 203 are arranged in a matrix, but the arrangement is not limited thereto, and may be arranged in any pattern according to actual needs, for example, in case of being partially radiated, the antenna elements may be arranged by groups according to different regions. The antenna elements reflect the electromagnetic wave signals phase-shifted by the respective phase shifters 202 toward one side of the RF link unit for reception by user equipment (UE) or other control device.

In an example, the antenna array may be an antenna of MIMO type and may implement spatial multiplexing, transceiving diversity and beamforming to bring various gains.

Although a transmission line such as a feed network is not constructed, the electronic device 200 according to an embodiment of the present disclosure may also be used to implement hybrid precoding and transmission of a user data stream, the specific principle of which will be described later in Sections 2-5. The electronic device 200 may also include a digital precoder 205 under the hybrid precoding architecture (as shown in FIGS. 4A-5B). The digital precoder 205 is depicted in a dashed box, indicating that the digital precoder 205 may be included in the electronic device 200, or may not be included in the electronic device 200 because the digital precoding is not essential in the present disclosure and in the later case, the electronic device 200 according to an embodiment of the present disclosure implements only the analog precoding and transmission of the user data stream. The digital precoding may be performed on each data stream in the baseband according to a digital precoding matrix to suppress an interference between the data streams. The digital precoded data stream is then mapped onto a corresponding RF link unit 201 for subsequent operations.

The processing circuitry 204 may be a central processing unit, a field programmable gate array, a digital signal processor, an application specific integrated circuit, or the like. It may be configured to determine an analog precoding matrix to be used by the phase shifters 202 for phase shifting. The processing circuitry 204 may determine the analog precoding matrix based on a method for determining the analog precoding matrix described in detail below in Section 5. For example, the processing circuitry 204 may determine the analog precoding matrix based on a channel matching criterion for matching channel response.

In addition, the processing circuitry 204 may also determine a digital precoding matrix to be used by the digital precoder 205 for digital precoding. A method for determining the digital precoding matrix will be described in detail below in Section 6. Moreover, the processing circuitry 205 may also provide necessary information and control for other components of the electronic device 200, such as the RF link units 201, the antenna array 203, the active control circuitry referred to below in Section 2 and the like.

The electronic device 200 may further include a memory 206. The memory 206 may store various information generated by the processing circuitry 201, program or data used for operating the electronic device 200 or the like, such as the determined analog precoding matrix and digital precoding matrix, etc. The memory 205 is depicted by a broken line, since it may also reside within the processing circuitry 204 or outside the electronic device 200. The memory 206 may be a volatile memory and/or a non-volatile memory. For example, the memory 206 may include but is not limited to a random access memory (RAM), a dynamic random access memory (DRAM), a static random access memory (SRAM), a read only memory (ROM), a flash memory.

2. Reflective Array Antenna of an Embodiment of the Present Disclosure

A structural diagram of the reflective array antenna for implementing the aforementioned electronic device according to an embodiment of the present disclosure will be described below with reference to FIG. 3A.

Figure 3A:
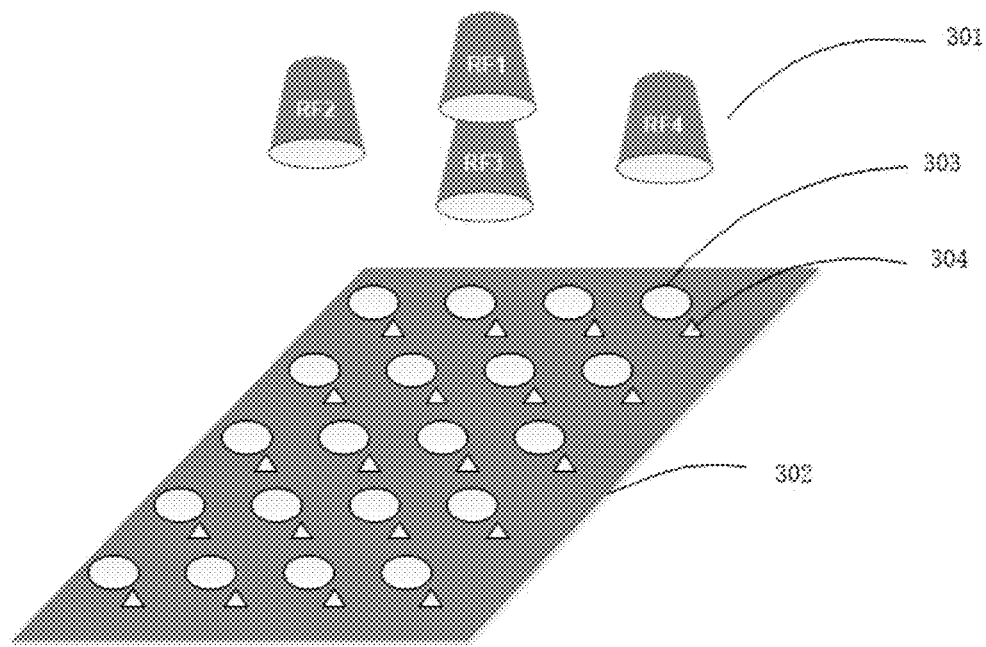
FIG. 3A is a simplified structural diagram showing a reflective array antenna according to an embodiment of the present disclosure.

As shown in FIG. 3A, the reflective array antenna according to an embodiment of the present disclosure is constituted by, for example, electromagnetic wave radiation ends 301 (as feeders) of the above-described RF link units 201 and a reflection array plane 302. The reflective array plane 302 may include a plurality of antenna elements 303 arranged in a specific pattern, and may inductively receive the electromagnetic wave radiation emitted by the feeders via a design of special materials, electromagnetism and the like. In the example as shown in FIG. 3A, the reflective array plane 302 further includes a plurality of phase shifters 304 having the same number as and in one-to-one correspondence with the antenna elements 303. The data stream is converted to an electromagnetic wave signal (RF signal) at the feeder, and is transmitted by the feeder into space toward the reflective array plane and received at the reflective array plane.

The transmission between the RF link and the antenna of the phased array antenna as mentioned above relies on the construction of a transmission line such as a feeding network, because the phased array antenna may not directly receive the transmitted electromagnetic waves. The present disclosure will accomplish this object by using such reflective array antenna that is different from the phased array antenna. Some examples of the reflective array antenna are described in detail below.

In a preferred example, the reflective array antenna is an electrically controlled reconfigurable reflective array antenna, wherein each array element is an antenna element loaded with tunable electrical devices (eg, with a MEMS switch, a varactor diode, or a PIN diode, etc.). The loaded electrical devices may change electromagnetic characteristics of the array element such that the electromagnetic wave signal, when received inductively by the array element, is added with a phase change first and then transmitted by the ananten element, value of the phase change being determined by parameters of the loaded electrical devices. The parameters of the tunable electrical devices may be adjusted by an active control circuit (e.g., the processing circuitry 204) to control the tunable electrical devices to phase shift the received electromagnetic wave signal.

Such reflective array plane 302 comprising antenna elements 303 loaded with tunable electrical devices 304 may be considered as an integration of the phase shifters 202 and the antenna array 203 used in the electronic device 200 as described with reference to FIG. 2, for example, it may be integrated as a reconfigurable electromagnetic plane, also known as a binary array. Moreover, the reflective array antenna including such feeders 301 and reflective array plane 302 may be referred to herein as a multi-feeder reconfigurable reflective array antenna, and a further description will be made in Section 3 below by taking this as example.

However, it should be noted that in addition to the reflective array antenna formed by the above technique, the reflective array antenna may be formed by other techniques. For example, although the phase shifter 304 and corresponding antenna element 303 of the antenna array plane 302 are an integrated component in the above example, they may also be separate components, in which case the phase shifter 304 receives the electromagnetic wave signal by the aforementioned inductive receiving technique or the like and implements the analog precoding operation, and then transmits it to the corresponding antenna element for transmission. In fact, the object of the present disclosure may be achieved as long as the reflective array antenna is capable of phase shifting and reflecting the electromagnetic wave signal from the feeder according to predetermined parameters (e.g., an analog precoding matrix).

In an extended example, the active control circuit may also control the tunable electric devices to adjust both of the phase and amplitude of the received electromagnetic wave signal by adjusting the parameters of the tunable electric devices. For sake of distinction, an antenna array which adjusts only the phase of the electromagnetic wave signal is referred to as a passive antenna array, and an antenna array that adjusts both of the phase and the amplitude of the electromagnetic wave signal is referred to as an active antenna array, which has an amplitude modulation unit correspondingly before each phase shifter and in which the analog precoding may include not only the phase shifting using the phase shifter but also the amplitude modulation using the amplitude modulation unit. As may be seen later with reference to FIGS. 4A-4B, the parameters used by tunable electrical devices in the passive antenna array in the analog precoding determination process described later with reference to Section 5 satisfy a constant modulus constraint, since only the phase is adjusted. For the active antenna array, as may be seen later with reference to FIGS. 5A-5B, since both of the phase and the amplitude are adjusted, the analog precoding determination process will no longer satisfy the constant modulus constraint, but the corresponding amplitude constraint is determined by an adjustment range of the amplitude modulation unit in the tunable electrical device.

The electromagnetic wave radiation ends as feeders are placed to face the reflection array plane, so that the emitted electromagnetic wave signals are directly radiated to the antenna array. Although N=4 electromagnetic wave radiation ends, that is, 4 RF link units are shown in FIG. 3A, the number is not limited thereto, and the number or position may be adjusted according to actual needs.

In the example shown in FIG. 3A, the radiation directions of the electromagnetic wave radiation ends are the same direction. However, the radiation direction of each electromagnetic wave radiation end is not limited to this. For example, in case of a partial radiating (corresponding to the partial connection described in the background art), different electromagnetic wave radiation ends may face different regions of the antenna array, such that a different electromagnetic wave signal from an electromagnetic wave radiation end is radiated to only a part of the antenna elements on the antenna array either by appropriately arranging the phase shifters in different regions or by using appropriate isolating materials, so as to implement the partial connection.

Figure 3B:
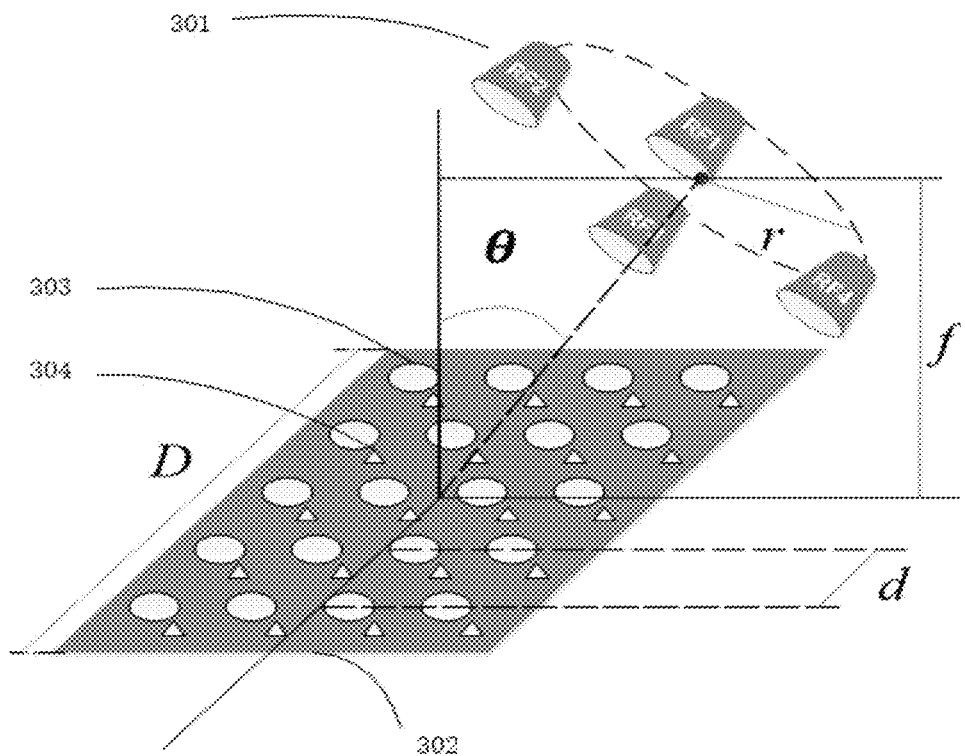
FIG. 3B is a schematic diagram showing a placement of feeders according to an embodiment of the present disclosure.

The placement of the electromagnetic wave radiation ends (the feeders) is flexible, but once determined, it is difficult to be modified during a life of the antenna, and the optimal placement scheme is channel-dependent, so a heuristic placement solution is proposed here. FIG. 3B is a schematic diagram showing a placement of the feeders according to a preferred embodiment of the present disclosure. In this embodiment, a plurality of electromagnetic wave radiation ends 301 are arranged in a circle facing the antenna array 302, which is geometrically a circumcircle of the plurality of electromagnetic wave radiation ends 301.

Preferably, the plurality of electromagnetic wave radiation ends 301 are uniformly arranged, that is, the intervals between the plurality of electromagnetic wave radiation ends are equal.

Preferably, a distance f from the center of the circle in which the plurality of electromagnetic wave radiation ends 301 are arranged to the plane of the antenna array 302 satisfies: $0.7D \leq f \leq 1.2D$, where D is the width of the antenna array.

Preferably, an angle $\theta$ between the axis of the circle in which the plurality of electromagnetic wave radiation ends 301 are arranged and the normal of the plane of the antenna array 302 satisfies: $\theta=0$, that is, the plane of the circle is parallel to the plane of the antenna array 302; or $15° \leq \theta \leq 25°$, that is, the plane of the circle is inclined with respect to the plane of the antenna array 302.

Preferably, the radius r of the circle in which the plurality of electromagnetic wave radiation ends 301 are arranged satisfies: $d \leq r \leq 0.5D$, where d is an average distance between the antenna elements 303 of the antenna array.

Although the preferred arrangement of the plurality of electromagnetic wave radiation ends 301 with respect to the antenna array 302 is described above with reference to FIG. 3B, the arrangement of positions of the feeders is not limited thereto. The arrangement of the electromagnetic wave radiation ends with respect to the antenna array determines the distance between each of the electromagnetic wave radiation ends and each of the antenna elements of the antenna array, and the distance is also the distance of propagation of the electromagnetic wave signal to the antenna element, which affects the phase change of the electromagnetic wave signal during the radiating process. Therefore, it is possible to obtain a preferred phase change during the radiating process, such as a phase change matrix $F_{fp}$ which will be described in Section 5 below, by reasonably arranging the positions of the electromagnetic wave radiation ends with respect to the antenna array.

3. Hybrid Precoding Structure of the Reflective Array Antenna According to an Embodiment of the Present Disclosure Now, schematic diagrams of two cases where two types of reflective array antenna arrays are fully radiated and partially radiated according to an embodiment of the present disclosure will be described with reference to FIGS. 4A-4B and 5A-5B.

Figure 4A:
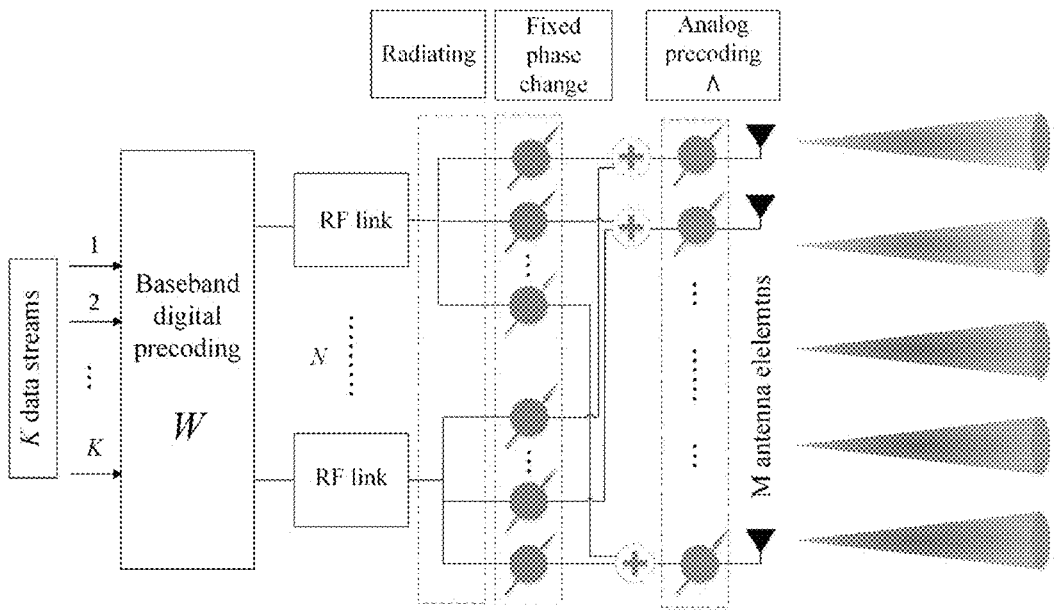
FIGS. 4A-4B are schematic diagrams showing the hybrid precoding architecture of a passive reflective array antenna according to an embodiment of the present disclosure.

FIG. 4A is a diagram showing a case where a passive reflection array antenna is fully radiated. "fully radiated" (full radiating) means that each of the electromagnetic wave radiating ends is radiated to all of the array elements of the antenna array, thereby achieving a full connection of the RF links with the antenna array (corresponding to the fully connected architecture in the background art). As shown in FIG. 4A, in case of the full radiating, each of the RF links is connected to all of the antenna elements. For example, the electromagnetic wave signal emitted by the electromagnetic wave radiation end of the first RF link unit is subjected to a fixed phase change associated with the distance from the electromagnetic wave radiation end to the i-th (i=1, 2 ... M) antenna element, and is superimposed spatially with electromagnetic wave signals emitted from other electromagnetic wave radiation ends and subjected to corresponding fixed phase changes. The superimposed signal arrives at the i-th antenna element and is phase-shifted by a phase shifter corresponding to the antenna element according to a predetermined parameter. The electromagnetic wave signals emitted by the electromagnetic wave radiation ends of the 2nd, 3rd, . . . , N-th RF link units undergo the similar process. Note that although solid line connections similar to the prior-art feeding network in FIG. 1A are shown between the RF links and the antenna elements in FIG. 4A, in practice, signals exist in form of electromagnetic wave radiations between the RF links and the antenna elements as previously described in Section 1, and there is no such feed network formed by physical lines. Although symbols are shown for the combiners in FIG. 4A, they are only for easy understanding. In fact, in the reflective array antenna according to an embodiment of the present disclosure, signals from the electromagnetic wave radiation ends are superimposed in the propagation space without requiring physical combiners. Further, although phase shifters corresponding to fixed phase changes are shown in FIG. 4A, they are only for easy understanding. In fact, a fixed phase change corresponds to a propagation distance of the electromagnetic wave signal, and there is not a physical phase shifter of a fixed phase. In other words, these schematic symbols (the solid-line connection corresponding to the radiating, the phase shifter corresponding to the fixed phase change, and the plus sign corresponding to the combiner) are only for better understanding of a change experienced by the electromagnetic wave during the radiating from the electromagnetic wave radiating end to the antenna array. These precautions also apply to FIG. 5A which will be described later. It should also be noted that differently from the electromagnetic wave radiating between the RF link and the antenna array as previously described in Section 1, the horn-shape symbol on the rightmost side of FIG. 4A represents a transmitting beam propagating in free space between the antenna elements and a communication object (such as a user equipment or other control device), and the same applies to FIGS. 4B, 5A, and 5B.

Figure 1B:
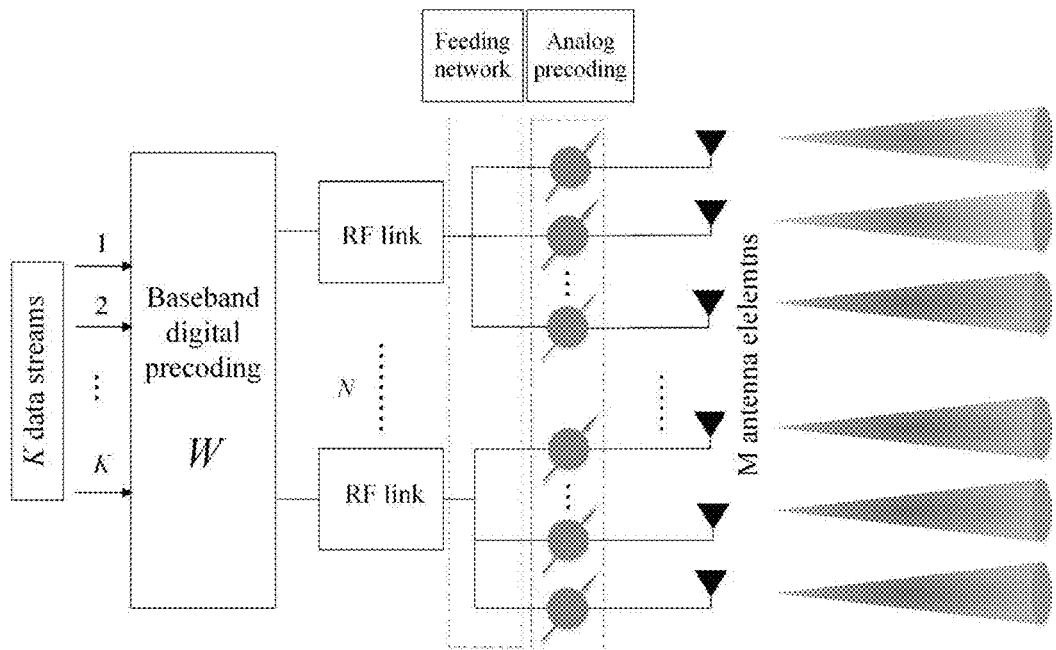
Figure 4B:
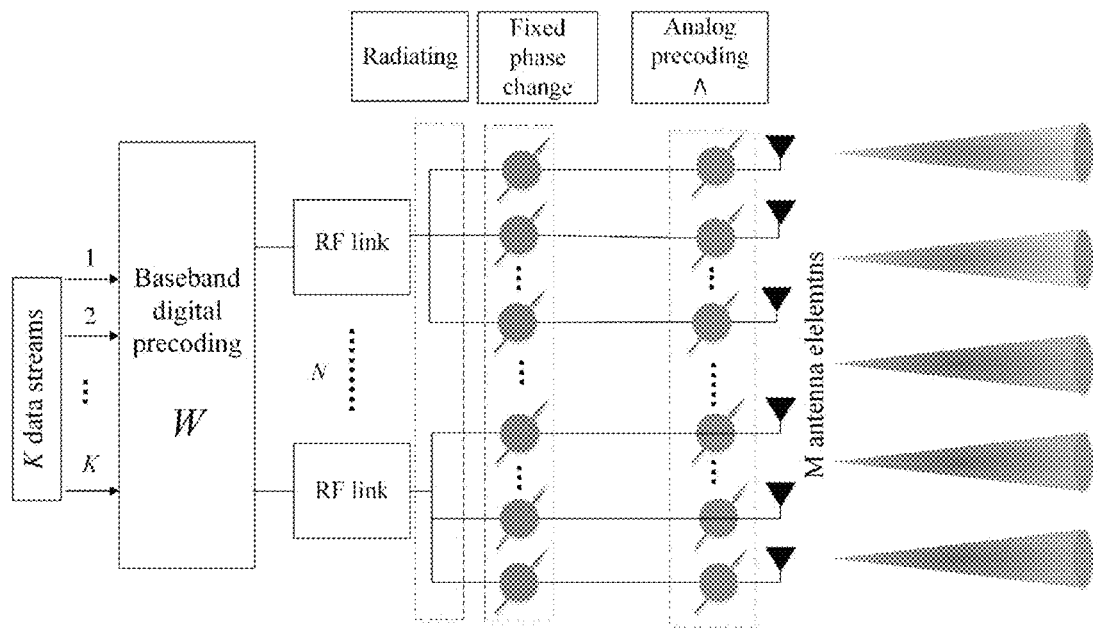

FIG. 4B is a diagram showing a case where a passive reflection array antenna is partially radiated. "partially radiated" (partial radiating) means that each of the electromagnetic wave radiating ends is radiated to only a part of the array elements of the antenna array. Preferably, the plurality of electromagnetic wave radiating ends are radiated to mutually exclusive subsets of the antenna elements of the antenna array, respectively. As previously mentioned, this may be implemented, for example, by having different electromagnetic wave radiating ends face different regions of the antenna array, or by having the phase shifters be properly distributed in different regions, or by using suitable isolating materials. As shown in FIG. 4B, in case of the partial radiating, each RF link is connected to a subset of the antenna elements. For example, the electromagnetic wave signal emitted by the electromagnetic wave radiation end of the first RF link unit is subjected to a fixed phase change associated with the distance from the electromagnetic wave radiation end to the i-th (i∈a subset of the antenna elements) antenna element, and is phase shifted by the phase shifter corresponding to the antenna element according to the determined precoding matrix upon arrival. A similar process is applied to the electromagnetic wave signals emitted by the electromagnetic wave radiation ends of the 2nd, 3rd, . . . , N-th RF link units. Similar to FIG. 4A, although solid-line connections similar to the prior-art feeding network in FIG. 1B are shown between the RF links and the antenna elements in FIG. 4B, in practice, signals exist in form of electromagnetic wave radiations between the RF links and the antenna elements as previously described in Section 1, and there is no such feed network formed by physical lines. Further, although phase shifters corresponding to fixed phase changes are shown in FIG. 4B, they are only for easy understanding. In fact, a fixed phase change corresponds to a propagation distance of the electromagnetic wave signal, and there is no physical phase shifter corresponding to the fixed phase change. These precautions also apply to FIG. 5B which will be described later.

Figure 5A:
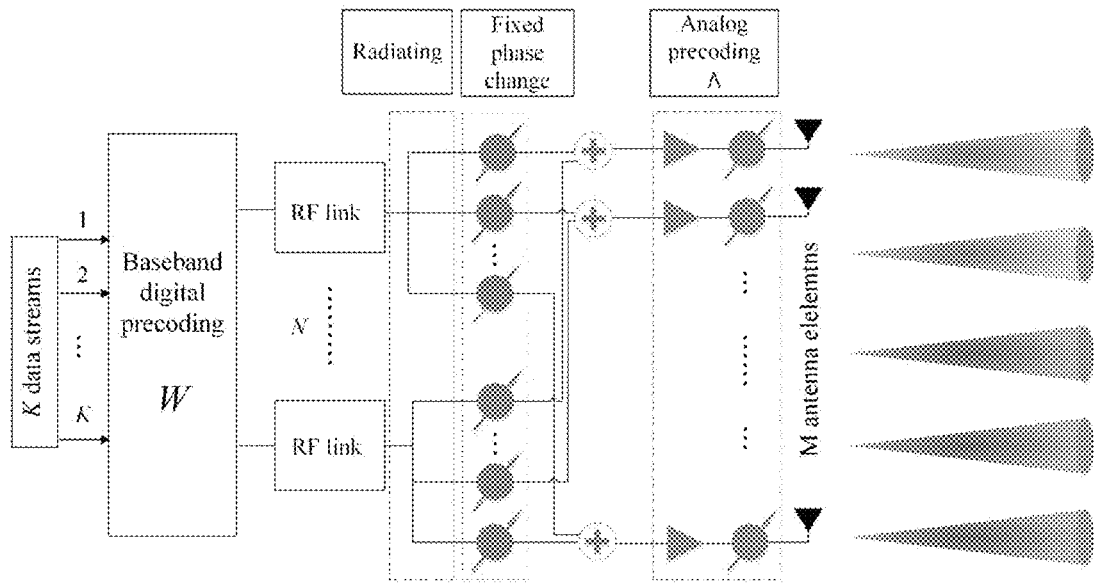
FIGS. 5A-5B are schematic diagrams showing the hybrid precoding architecture of an active reflective array antenna according to an embodiment of the present disclosure.

FIG. 5A is a diagram showing a case where an active reflective array antenna is fully radiated. As shown in FIG. 5A, in case of the full radiating, each of the RF links is connected to all of the antenna elements. FIG. 5A is similar to FIG. 4A, but is different in that the phase shifter further includes an amplitude modulation unit at the front end of the phase shifting component, so that the antenna array shown in FIG. 5A not only changes the phase of the electromagnetic wave signal but also changes the amplitude of the electromagnetic wave signal using the amplitude modulation unit, allowing for greater deployment flexibility and design freedom, as well as improved precoding performance.

Figure 5B:
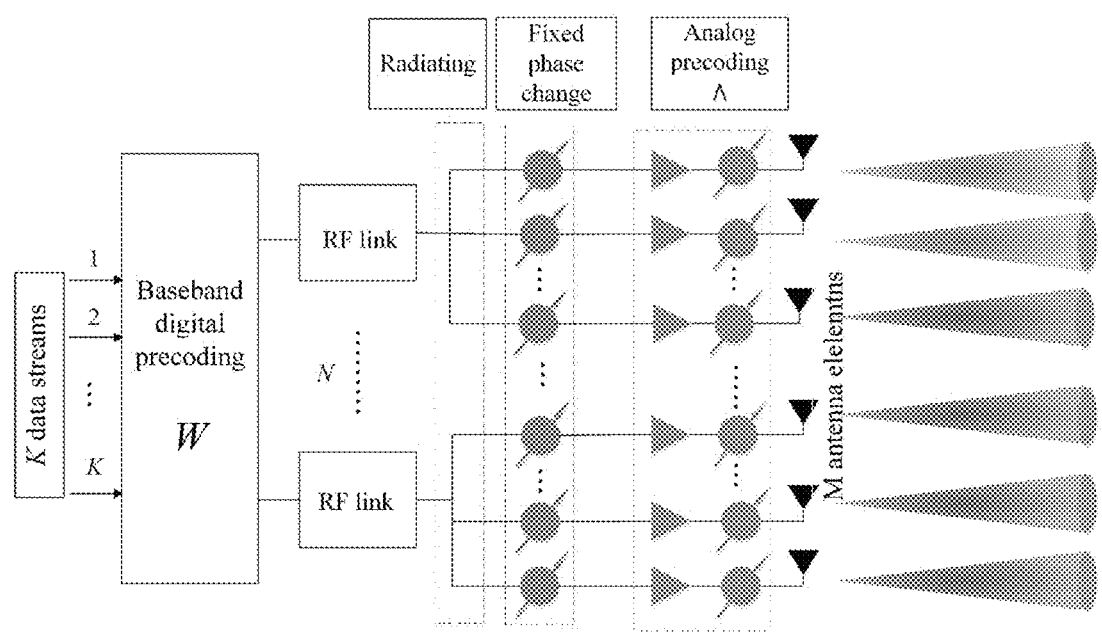

FIG. 5B is a diagram showing a case where an active reflective array antenna is partially radiated. As shown in FIG. 5B, in case of the partial radiating, each of the RF links is connected to a subset of the antenna elements. FIG. 5B is similar to FIG. 4B, but is different in that the phase shifter further includes an amplitude modulation unit at the front end of a phase shifting component, so that the antenna array shown in FIG. 5A not only changes the phase of the electromagnetic wave signal but also changes the amplitude of the electromagnetic wave signal using the amplitude modulation unit, allowing for greater deployment flexibility and design freedom, as well as improved precoding performance.

The connection from the feeder of the reflective array antenna to the antenna array is described above with reference to FIGS. 4A-4B and 5A-5B. When also taking the digital precoding and the transmission via a transmission channel of the data stream into account, the mathematical transmission model for downlink signal according to an embodiment of the present disclosure may be expressed as the following Equation (1):

$$\vec{y} = \rho H \Lambda F_{fp} W \vec{x} + \vec{n} \qquad (1)$$

Where $\vec{x}$ denotes K data streams, $\vec{y}$ denotes a signal received at the receiving end after being transmitted by the antenna elements, W denotes a digital precoding matrix, $F_{fp}$ denotes a phase change matrix, any element of which denotes a fixed phase change caused by radiating of an electromagnetic wave signal from an electromagnetic wave radiation end to an antenna element, A represents an analog precoding matrix, H represents a channel matrix of the transmitting channel, p is a scalar factor of path loss, antenna gain, etc., and $\vec{n}$ represents an additive Gaussian white noise vector. Wherein, when the multi-feeder reconfigurable reflective array antenna according to an embodiment of the present disclosure is used to transmit K data streams, the number of radio link units is N, the number of antenna elements (equal to the number of phase shifters) is M, y, x and n are vectors of K×1 dimensions, W is a matrix of N×K dimensions, $F_{fp}$ is a matrix of M×N dimensions, A is a matrix of M×M dimensions, and H is a matrix of K×M dimensions. In general, K≤N≤M is satisfied.

For a passive reflective array antenna, as previously described in Section 2, the elements of the analog precoding matrix satisfy the constant modulus constraint (the modulus of the elements is 1), and the mathematical transmission model described by Equation (1) may be represented by the following matrix:

$$\begin{bmatrix} y_1 \\ \vdots \\ y_K \end{bmatrix} = \rho \begin{bmatrix} h_{1,1} & \cdots & \cdots & h_{1,M} \\ \vdots & \ddots & \ddots & \vdots \\ h_{K,1} & \cdots & \cdots & h_{K,M} \end{bmatrix} \begin{bmatrix} \exp(j\alpha_1) & \cdots & 0 \\ \vdots & \ddots & \vdots \\ 0 & \cdots & \exp(j\alpha_M) \end{bmatrix} \begin{bmatrix} f_{1,1} & \cdots & f_{1,N} \\ \vdots & \ddots & \vdots \\ f_{M,1} & \cdots & f_{M,N} \end{bmatrix} \begin{bmatrix} w_{1,1} & \cdots & w_{1,K} \\ \vdots & \ddots & \vdots \\ \vdots & \ddots & \vdots \\ w_{N,1} & \cdots & w_{N,K} \end{bmatrix} \begin{bmatrix} x_1 \\ \vdots \\ x_K \end{bmatrix} + \begin{bmatrix} n_1 \\ \vdots \\ n_K \end{bmatrix}$$

For an active reflective array antenna, as previously described in Section 2, the elements of the analog precoding matrix may not satisfy the constant modulus constraint, and the mathematical transmission model described by Equation (1) may be represented by the following matrix:

$$\begin{bmatrix} y_1 \\ \vdots \\ y_K \end{bmatrix} = \rho \begin{bmatrix} h_{1,1} & \cdots & \cdots & h_{1,M} \\ \vdots & \ddots & \ddots & \vdots \\ h_{K,1} & \cdots & \cdots & h_{K,M} \end{bmatrix} \begin{bmatrix} c_1 & \cdots & 0 \\ \vdots & \ddots & \vdots \\ 0 & \cdots & c_M \end{bmatrix} \begin{bmatrix} f_{1,1} & \cdots & f_{1,N} \\ \vdots & \ddots & \vdots \\ f_{M,1} & \cdots & f_{M,N} \end{bmatrix} \begin{bmatrix} w_{1,1} & \cdots & w_{1,K} \\ \vdots & \ddots & \vdots \\ \vdots & \ddots & \vdots \\ w_{N,1} & \cdots & w_{N,K} \end{bmatrix} \begin{bmatrix} x_1 \\ \vdots \\ x_K \end{bmatrix} + \begin{bmatrix} n_1 \\ \vdots \\ n_K \end{bmatrix}$$

4. Communication Method According to an Embodiment of the Present Disclosure A communication method according to an embodiment of the present disclosure is described below with reference to the flowchart of FIG. 6. This communication method may be applied to for example the electronic device 200 as shown in FIG. 2.

Figure 6:
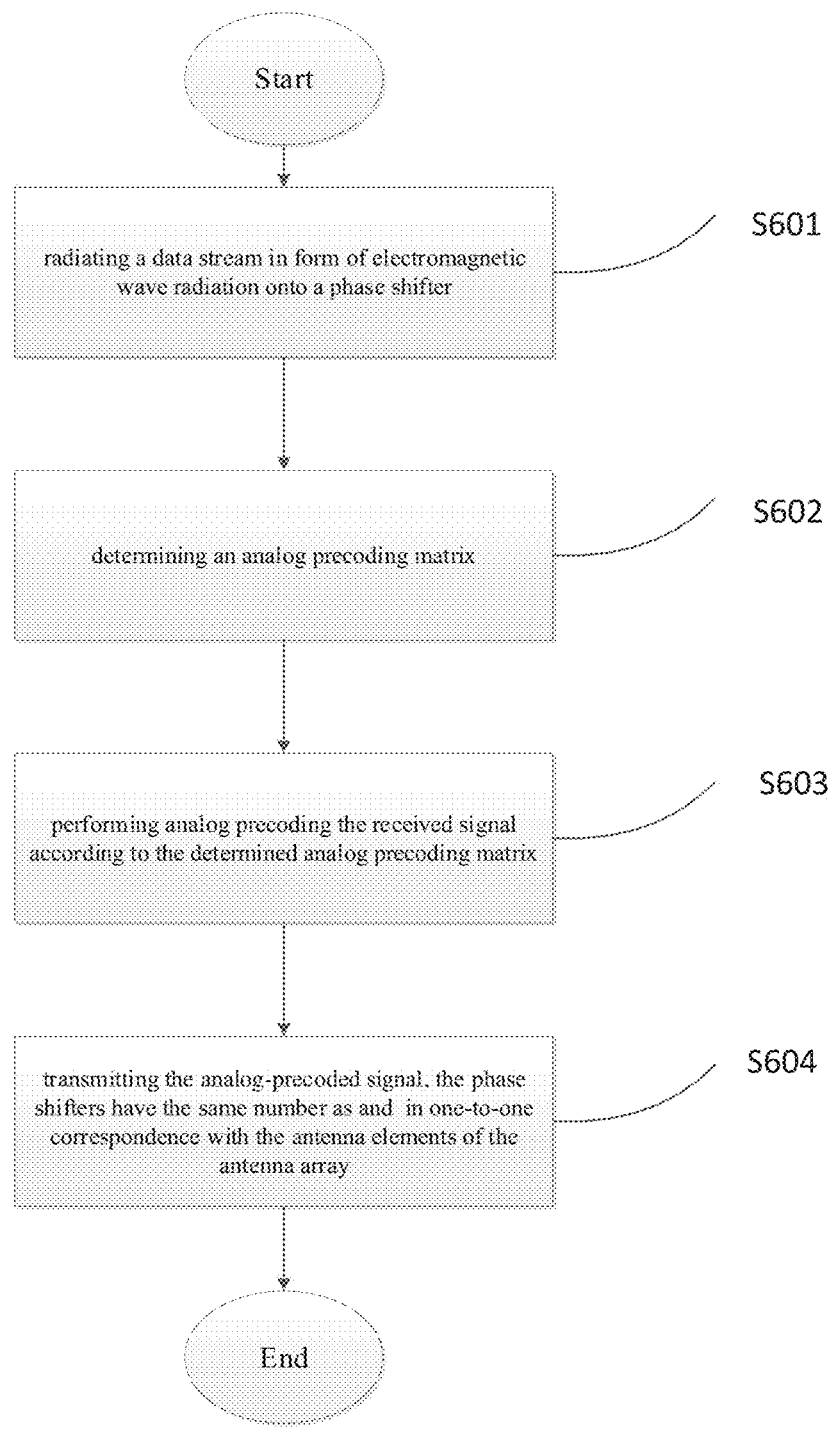
FIG. 6 is a flowchart illustrating a communication method according to an embodiment of the present disclosure.

As shown in FIG. 6, in Step S601, data streams are radiated to the phase shifters in form of electromagnetic wave radiations. This step may be performed by the RF link units 201 of the electronic device 200 as depicted in FIG. 2. "Radiating" means that an electromagnetic wave signal (RF signal) is directly radiated (radiated) from an electromagnetic wave radiation end of a RF link unit 201 to the antenna array via intermediate air medium rather than a physical connection over a distance of the order of the antenna array size.

In Step S602, an analog precoding matrix is determined. This step may be performed by the processing circuitry 204 of the electronic device 200 as depicted in FIG. The processing circuitry may be a central processing unit, a field programmable gate array, a digital signal processing or an application specific integrated circuit, or the like. The details of determining the analog precoding matrix by the processing circuitry are described in Section 5 below.

In Step S603, analog precoding is performed on the received signal according to the analog precoding matrix determined by the processing circuitry. The step may be performed by the phase shifters 202 of the electronic device 200 as depicted in FIG. 2. Based on corresponding parameters in the analog precoding matrix determined by processing circuitry 204, each of the phase shifters 202 may phase shift the received signal of the electromagnetic wave radiation to effect the analog precoding.

Finally, in Step S604, the analog-precoded signal is transmitted, wherein the phase shifters have the same number as and are in one-to-one correspondence with the antenna elements in the antenna array. The step may be performed by the antenna array 203 of the electronic device 200 as depicted in FIG. 2. The antenna elements of the antenna array reflect the electromagnetic wave signals phase-shifted by the respective phase shifters toward the RF link unit side for reception by a user equipment (UE) or other control device.

In an example, the antenna array may be an antenna of MIMO type and may implement spatial multiplexing, transceiving diversity, and beamforming to bring various gains.

It is clear from the above description of the electronic device and the communication method using the reflective array antenna, the transmission of the signals from the RF links to the antenna array according to the present disclosure does not depend on the construction of a transmission line such as a feeding network. Therefore, on one hand, the signal does not experience a significant power attenuation in the radiation over a distance of the order of the antenna array size, and on the other hand, the hardware complexity for constructing the transmission line, using phase shifters and/or combiners and the like are not increased even in the large-scale antenna array, while the cost of the feeding network is eliminated, even without requiring any combiners and splitters at the RF end, thereby further reducing the cost burden.

In order to achieve an excellent reception similar to the case of the phased array antenna at the receiving end, the main part of the above mathematical transmission model, especially the analog precoding matrix and the digital precoding matrix, will be optimized starting from Equation (1). As will be seen later, by optimizing the design, the present disclosure will greatly reduce hardware complexity and reduce power consumption while ensuring a performance comparable to a device using the phased array antenna.

5. Determination of the Analog Precoding Matrix According to an Embodiment of the Present Disclosure

5.1 General Determination Criteria for the Analog Precoding Matrix

Referring to the above Equation (1), the transmission model for the downlink signal according to an embodiment of the present disclosure may be expressed as: $\vec{y} = \rho H A F_{fp} W \vec{x} + \vec{n}$.

The channel matrix H describes inherent characteristics of the transmitting channel between the antenna array and a user equipment. There are a variety of techniques for acquiring the channel matrix H, such as by measurement of reference signals, CSI feedback by the user equipment, etc., which are not described in detail herein. In an example, the channel matrix H is obtained according to a particular algorithm or stored in, for example, the memory 206 in advance. $\rho$ is a scalar factor for path loss, antenna gain, etc., and $\vec{n}$ denotes an additive Gaussian white noise vector.

It can be seen that in order to achieve an excellent reception at the user equipment end, much importance is attached to the optimization of the phase change matrix $F_{fp}$, the analog precoding matrix $\Lambda$, and the digital precoding matrix W. In the present disclosure, the analog precoding matrix and the digital precoding matrix are separately determined by using the idea of analog/digital separation. In an example, the analog precoding matrix is first determined, and the digital precoding matrix is then determined based on the determined analog precoding matrix.

There are many approaches to determine the analog precoding matrix. In an embodiment of the present disclosure, the analog precoding matrix is determined mainly based on a channel matching criterion for matching the channel response, that is, by adjusting the amplitude and phase of the signal to be transmitted at the antenna end, to match them with the channel response between the transmitting end and the receiving end, and using the channel gain to form a spatial beam, thereby optimizing the signal power at the receiving end.

In fact, it may be seen from the schematic diagrams of FIGS. 5A-5B that since the distance between the electromagnetic wave radiation end and the antenna element depends on the position of the electromagnetic wave radiation end as the feeder relative to the antenna array, the distance between each electromagnetic wave radiation end and the antenna element is fixed once the reflection array antenna is arranged. Generally, the distance between each electromagnetic wave radiation end and each antenna element varies, so that the fixed phase change of the electromagnetic wave signal propagating between them is different.

Therefore, when determining the analog precoding matrix, the fixed phase change caused by the radiating of the electromagnetic wave signal between the electromagnetic wave radiation end corresponding to each data stream and each antenna element in the antenna array is considered first, so that the phase adjustment can be determined more accurately based on the channel matching criterion by using the fixed phase change.

5.2 Embodiment for Determining the Analog Precoding Matrix

As described above, for better channel matching, the analog precoding matrix is to be determined by taking the fixed phase change into account.

First, as seen from the simplified structure of the reflective array antenna described above with reference to FIG. 3A, the element $[F_{fp}]_{i,k}$ in the phase change matrix $F_{fp}$ represents the phase change caused by the propagation of the electromagnetic wave signal radiated by the electromagnetic wave radiation end corresponding to the k-th data stream to the i-th antenna element of the antenna array. The phase change is determined by the distance between the electromagnetic wave radiation end and the antenna element and the carrier frequency of the electromagnetic wave signal as shown in Equation (2):

$$[F_{fp}]_{i,k} = \exp\left\{ j \cdot 2\pi \frac{[L]_{i,k}}{\lambda} \right\} \qquad (2)$$

where $[L]_{i,k}$ is the distance between the electromagnetic wave radiation end corresponding to the kth data stream and the i-th antenna element, and $\lambda$ is the carrier wavelength of the electromagnetic wave signal. Since there may be many possible arrangements of the feeders as described above in Section 2, a plurality of phase change matrices $F_{fp}$ may be present accordingly. However, in the present disclosure, it is preferable to adopt a circular arrangement of the plurality of electromagnetic wave radiation ends 301 with respect to the antenna array 302 as described with reference to FIG. 3B, and the phase change matrix $F_{fp}$ obtained from Equation (2) with this arrangement is assumed to be a preferred phase change of the present disclosure.

Specifically, the center point of the plane where the antenna array 302 is located is taken as the origin, and the plane where the antenna array 302 is located is the xOy plane, and the row and column arrangement directions of the antenna array elements are the y-axis and the x-axis directions, respectively, and then a spatial rectangular coordinate system may be established. In this coordinate system, the coordinate of the center of the circle where the radiating ends 301 are arranged may be set to (0, f tan θ, f), and the coordinate of the k-th radiating end 301 is:

$$t_k = \left( r\cos\frac{2\pi}{N}(k-1), r\sin\frac{2\pi}{N}(k-1) + f\tan\theta, f \right)$$

The capital letter N is the total number of the radiating ends 301 (the number of the RF links). The coordinate of the i-th antenna element 303 located in the m-th row and the n-th column are:

$$s_i = \left( \frac{D}{2} + (n-1)d, \frac{D}{2} + (m-1)d, 0 \right)$$

Thereby $[L]_{i,k}$ is got:

$$[L]_{i,k} = \|t_k - s_i\|_2$$

The symbol $\|\bullet\|_2$ indicates taking 2-norm of corresponding vector. By substituting the $[L]_{i,k}$ thus obtained into the above Equation (2), the phase change matrix $F_{fp}$ may be calculated as the preferred phase changes, and thus may be used as a preferred example for the subsequent determination of the analog precoding matrix.

The basic idea of determining the analog precoding matrix is as follows:

1) From the above Equation (2), based on the distance between each of the electromagnetic wave radiation ends and each of the antenna elements and the carrier frequency of the electromagnetic wave signals, determining the phase change matrix $F_{fp}$;

2) Based on the phase change matrix $F_{fp}$ and the channel matrix H, the analog precoding matrix A is determined by employing the channel matching criteriaon that is, $\Lambda F_{fp}$ is matched with H.

In determining the analog precoding matrix A, a specific determination criterion is used while taking into account the constraints of the reflective array antenna (as described in Section 2, the constant modulus is satisfied since only the phase is adjusted in the passive antenna array, but for the active antenna array, since both of the phase and the amplitude are adjusted, the constant modulus constraint will no longer be satisfied in the analog precoding design, whereas the corresponding amplitude constraint is determined by an adjustment range of the amplitude modulation unit), resulting in the final analog precoding matrix $\Lambda$.

5.2.1 the First Embodiment of Determining the Precoding Matrix

In this embodiment, the minimum Euclidean distance criterion based on channel matching may be used:

$$\Lambda^* = \underset{\Lambda}{\operatorname{argmin}} \|H^H - \Lambda F_{fp}\|_F^2 \qquad (3)$$

where $\Lambda^*$ is the optimal solution to the analog precoding matrix $\Lambda$, $H^H$ is a conjugate transposition matrix of the channel matrix H, and F is a type of the norm. Let $Q=F_{fp}$, then Equation (3) may be rewritten as:

$$\Lambda^* = \underset{\Lambda}{\operatorname{argmin}} \|H^H - \Lambda Q\|_F^2 \qquad (4)$$

Since each of the phase shifters performs only phase shifting/analog precoding on the electromagnetic wave signal received by itself, the analog precoding matrix is a diagonal matrix, that is, all elements than the diagonal elements are zero.

Equation (4) may be solved by representing the channel matrix H and the matrix Q as follows:

$$H = [h_1 \ \ldots \ h_M]$$

$$Q = \begin{bmatrix} q_1^H \\ \ldots \\ q_M^H \end{bmatrix},$$

where $h_i$ is the i-th column vector of H, and $q_i$ is a conjugate transposition of the i-th row vector of Q.

In an example, for the passive antenna array, the constant modulus constraint needs to be satisfied:

$$\Lambda = \begin{bmatrix} \exp(j\alpha_1) & \ldots & 0 \\ \vdots & \ddots & \vdots \\ 0 & \ldots & \exp(j\alpha_M) \end{bmatrix}.$$

In case of the fully radiated passive antenna array, as shown in FIG. 4A, each of the antenna elements receives an electromagnetic wave signal of each of the RF link units, and the solution to Equation (4) may be expressed as:

$$[\Lambda^*]_{i,i} = \frac{h_i^H q_i}{|h_i^H q_i|}, \quad i = 1 \ \ldots \ M \qquad (5)$$

In case of the partially radiated passive antenna array, as shown in FIG. 4B, each of the antenna elements receives only an electromagnetic wave signal from one RF link unit, so that it is possible to implement $\Lambda Q$ ($Q=F_{fp}$) perfectly matching the channel at the antenna element by using the phase shifter. Therefore, the solution to Equation (4) may be further expressed as:

$$[\Lambda^*]_{i,i} = \frac{\exp\{-j \cdot \angle([H^H]_{i,k})\}}{[Q]_{i,k}} = \frac{\exp\{-j \cdot \angle([H^H]_{i,k})\}}{[F_{fp}]_{i,k}} \qquad (6)$$

where $[H^H]_{i,k}$ represents the element in the i-th row and the k-th column of the matrix $H^H$ $[F_{fp}]_{i,k}$ represents the element in the i-th row and the k-th column of the matrix $F_{fp}$, and $\angle[H^H]_{i,k}$ is a function for taking the argument of the complex $[H^H]_{i,k}$.

In yet another example, for an active antenna array, the active antenna array is fully compatible with the above model in terms of mathematical model, in which case the analog precoding matrix $\Lambda$ is still a diagonal matrix, but it is not necessary for the phase shifter to satisfy the constant modulus constraint, and the amplitude of its elements may be changed, a degree of freedom of the design will be greater, and the precoding performance will be improved. Therefore, instead of the above constant modulus constraints, the following constraint needs to be satisfied:

$$\Lambda = \begin{bmatrix} c_1 & \ldots & 0 \\ \vdots & \ddots & \vdots \\ 0 & \ldots & c_M \end{bmatrix}$$

where $\Lambda$ does not need to satisfy the constant modulus constraint, the amplitude of the diagonal elements may be controlled by the amplitude modulation unit of the active antenna array which is located before the phase shifter at the front end of the antenna, that is, the amplitude modulation unit may use the analog precoding matrix determined according to such constraints to change the amplitude of the received electromagnetic wave radiation signal, as shown in FIGS. 5A-5B.

In case of the fully radiated active antenna array, as shown in FIG. 5A, each of the antenna elements receives an electromagnetic wave signal of each of the RF link units, and the solution to Equation (4) may be expressed as follows:

$$[\Lambda^*]_{i,i} = \frac{h_i^H q_i}{|q_i^H q_i|} \qquad (7)$$

where $h_i$ is the i-th column vector of H and $q_i$ is a conjugate transposition of the i-th row vector of $Q=F_{fp}$.

In case of the partially radiated active antenna array, as shown in FIG. 5B, each antenna element receives only an electromagnetic wave signal from one RF link unit, so that it is possible to implement $\Lambda Q$ ($Q=F_{fp}$) perfectly matching with the channel at the antenna element by using a phase shifter. Therefore, the solution to Equation (4) may be further expressed as:

$$[\Lambda^*]_{i,i} = \frac{\exp\{-j \cdot [H^H]_{i,k}\}}{[Q]_{i,k}} \quad (8)$$

where $[H^H]_{i,k}$ represents the element in the i-th row and the k-th column of the matrix $H^H$ and k represents the ordinal number of the RF link unit received by the i-th antenna.

5.2.2 the Second Embodiment of Determining the Precoding Matrix

In this embodiment, instead of directly using the matrix $F_{fp}$ for channel matching, an SVD singular value decomposition may be performed on the matrix $F_{fp}$, $$F_{fp} = USV^H$$

where the decomposed matrix V is a unitary matrix which is characterized in perservating the norm and does not affect the performance of the analog precoding, so only US needs to be considered. Therefore, as another embodiment of the channel matching criterion, the SVD-assisted minimum Euclidean distance criterion may be employed:

$$\Lambda^* = \arg\min_{\Lambda}\{\|H^H - \Lambda US\|_F^2\} \quad (9)$$

Similarly to the above operation, let $Q=US$, then Equation (9) may also be written in a similar form to Equation (4):

$$\Lambda^* = \arg\min_{\Lambda}\|H^H - \Lambda Q\|_F^2 \quad (10)$$

However, the difference from Equation (4) is that $Q=US$ in Equation (10).

In case of the fully radiated passive antenna array, as shown in FIG. 4A, each of the antenna elements receives an electromagnetic wave signal of each of the RF link units, and the solution to Equation (10) may be expressed as:

$$[\Lambda^*]_{i,i} = \frac{h_i^H q_i}{|h_i^H q_i|}, i = 1 \dots M \quad (11)$$

In case of the partially radiated passive antenna array, as shown in FIG. 4B, each of the antenna elements receives only an electromagnetic wave signal from one RF link unit, so that it is possible to implement $\Lambda Q$ ($Q=US$) perfectly matching with the channel at the antenna element by using a phase shifter. Therefore, the solution to Equation (10) may be further expressed as:

$$[\Lambda^*]_{i,i} = \frac{\exp\{-j \cdot \angle([H^H]_{i,k})\}}{[Q]_{i,k}} = \frac{\exp\{-j \cdot \angle([H^H]_{i,k})\}}{[US]_{i,k}} \quad (12)$$

where $[H^H]_{i,k}$ represents the element in the i-th row and the k-th column of the $H^H$ matrix, $[F_{fp}]_{i,k}$ represents the element in the i-th row and the k-th column of the $F_{fp}$ matrix, and $\angle[H^H]_{i,k}$ is a function for taking the argument of the complex $[H^H]_{i,k}$.

In yet another example, for an active antenna array, the active antenna array is completely compatible with the above model in terms of mathematical model, in which case the analog precoding matrix $\Lambda$ is still a diagonal matrix, but it is unnecessary for the phase shifter to satisfy the constant modulus constraint, the amplitude of its elements may be changed, and thus the degree of freedom of the design will be greater and the precoding performance will be improved. Therefore, instead of the above constant modulus constraints, the following constraint needs to be satisfied:

$$\Lambda = \begin{bmatrix} c_1 & \dots & 0 \\ \vdots & \ddots & \vdots \\ 0 & \dots & c_M \end{bmatrix}$$

where $\Lambda$ does not need to satisfy the constant modulus constraint, and the amplitude of the diagonal elements may be controlled by the amplitude modulation unit of the active antenna array at the front end of the antenna before the phase shifter, as shown in FIGS. 5A-5B.

In case of the fully radiated active antenna array, as shown in FIG. 5A, each of the antenna elements receives an electromagnetic wave signal of each of these RF link units, and the solution to Equation (10) may be expressed as:

$$[\Lambda^*]_{i,i} = \frac{h_i^H q_i}{|q_i^H q_i|} \quad (13)$$

where $h_i$ is the i-th column vector of H, and $q_i$ is a conjugate transposition of the i-th row vector of $Q=US$.

In case of the partially radiated active antenna array, as shown in FIG. 5B, each of the antenna elements receives only an electromagnetic wave signal from one RF link unit, so that it is possible to implement $\Lambda Q$ ($Q=US$) perfectly matching with the channel at the antenna element by using a phase shifter. Therefore, the solution to Equation (10) may be further expressed as:

$$[\Lambda^*]_{i,i} = \frac{\exp\{-j \cdot [H^H]_{i,k}\}}{[Q]_{i,k}} \quad (14)$$

where $[H^H]_{i,k}$ represents the element in the i-th row and the k-th column of the matrix $H^H$, and k represents the ordinal number of the RF link unit received by the i-th antenna.

The method for determining the analog precoding matrix in the cases of full radiating and partial radiating using the minimum Euclidean distance criterion based on channel matching and the SVD-assisted minimum Euclidean distance criterion based on channel matching has been discussed above. The determination of the analog precoding matrix may be performed by the processing circuitry 204 described with reference to FIG. 2. It should be noted that the determination of the analog precoding matrix does not have to be performed according to the principle of matching the channel, that is to say, it is not limited to the channel matching criterion, and other suitable criteria may also be applied. The scheme of matching the channel is also not necessarily the optimal solution. It may be difficult to find the optimal solution, so the principle of channel matching is heuristically employed.

6. Method for Designing the Digital Precoding Matrix

The method for designing the digital precoding matrix is discussed below. After the phase change matrix $F_{fp}$ is determined as above and the analog precoding matrix $\Lambda$ is determined by taking the fixed phase change into account, the digital precoding matrix may be determined based on existing digital precoding criteria, such as a zero forcing criterion, a minimum mean square error criterion, and the like.

In an example, the digital precoding matrix is determined by obtaining an equivalent channel from the channel matrix H, the phase change matrix $F_{fp}$, and the analog precoding matrix $\Lambda$. Preferably, by applying a zero-forcing criterion to the equivalent channel, the equation for designing the digital precoding matrix W may be:

$$W = \tilde{H}^H (\tilde{H}\tilde{H}^H)^{-1} D \qquad (15)$$

where the constraint of the digital precoding matrix W is to maintain a global power constraint for keeping the power of the antenna array constant:

$$\|\Lambda F W\|_F^2 = K \qquad (16)$$

where $\tilde{H} = H\Lambda F_{fp}$ represents a channel matrix of the equivalent channel in the baseband, and D is a K-order diagonal matrix representing allocated transmit power.

As described above, the criterion for determining the digital precoding matrix W is not limited to the zero forcing criterion, and may be based on existing digital precoding criteria, such as the minimum mean square error criterion or the like. Moreover, it should be noted that although the existing digital precoding criteria are employed, the digital precoding matrix is re-determined based on current parameters, rather than using existing digital precoding matrices in which case its performance would not be guaranteed.

The determination of the digital precoding matrix W may be performed by the processing circuitry 204 as described with reference to FIG. 2, and the processing circuitry 204 may also be a baseband processor at this time. The determined channel matrix H, the phase change matrix $F_{fp}$, the analog precoding matrix $\Lambda$, and the digital precoding matrix W may also be stored in the memory 206 for use in corresponding operations. For example, an optional digital precoder 205 performs the digital precoding on each data stream according to the determined digital precoding matrix W and transmits the digital-precoded data stream to the RF link unit 201, and then the operation process described with reference to FIG. 6 is carried out to perform the hybrid precoding according to the present disclosure on the data flow and to transmit it.

The hybrid precoding architecture according to an embodiment of the present disclosure has been described above. The entire precoding process is characterized in analog/digital separation. That is to say, the determination of the analog precoding is completely independent of the determination of the digital precoding. Intermediate parameters of the digital precoding matrix process are not considered in determining the analog precoding matrix, and in determining the digital precoding matrix, it is also only the determination result of the analog precoding matrix that is utilized, and intermediate parameters of the process for determining the analog precoding matrix are not used.

Since the hybrid precoding architecture mainly includes two parts: the determination of analog precoding and the determination of digital precoding, the final precoding performance of the transmitting system is mainly determined by the two parts, so the optimal precoding design should be a joint design of them. However, the joint design is difficult, so the present disclosure adopts the analog/digital separation design method to avoid great difficulties of the optimal joint design.

7. Performance of an Electronic Device Including the Reflective Array Antenna According to an Embodiment of the Present Disclosure Advantages of an electronic device including the reflective array antenna according to an embodiment of the present disclosure are explained below by comparing the conventional phased array antenna with the reflective array antenna according to an embodiment of the present disclosure.

The inventors of the present disclosure have confirmed the performance of the conventional phased array antenna and the reflective array antenna according to an embodiment of the present disclosure by simulation.

The simulation conditions are as follows: the number of antenna elements in the antenna array is $M=16\times16=256$, and the number of users simultaneously served by the base station is $K=8$ and $K=4$, providing one independent data stream for each user and letting the number N of RF links be equal to the number K of data streams. In addition, the number of channel multipaths is assumed to be $N_{ray}=3$, the standard deviation of channel angular expansion is 15 degrees, and the average signal to noise ratio (SNR) at the user receiving end ranges from −10 to 20 dB. The transmit matrix T is denoted as $T=H\Lambda FW$.

A SNR of the signal received by the k-th user may be expressed as:

$$SINR_k = \frac{\frac{\rho P}{K}|[T_{k,k}]|^2}{\frac{\rho P}{K}\sum_{i\neq k}|[T_{k,i}]|^2 + \sigma^2}, 1 \leq k \leq K,$$

where P is the total power of the transmitting end, and $\sigma^2$ is the variance of the additive Gaussian white noise at the receiving end, which is assumed to be the same for all users, and the average SNR at the receiving end is expressed as:

$$\eta = \frac{\rho P}{K\sigma^2}.$$

Thus, the reachable rate of the system may be calculated according to the Shannon mapping:

$$R = \sum_1^K r_k = \sum_1^K \log_2(1+SINR_k), 1 \leq k \leq K.$$

Figure 7A:
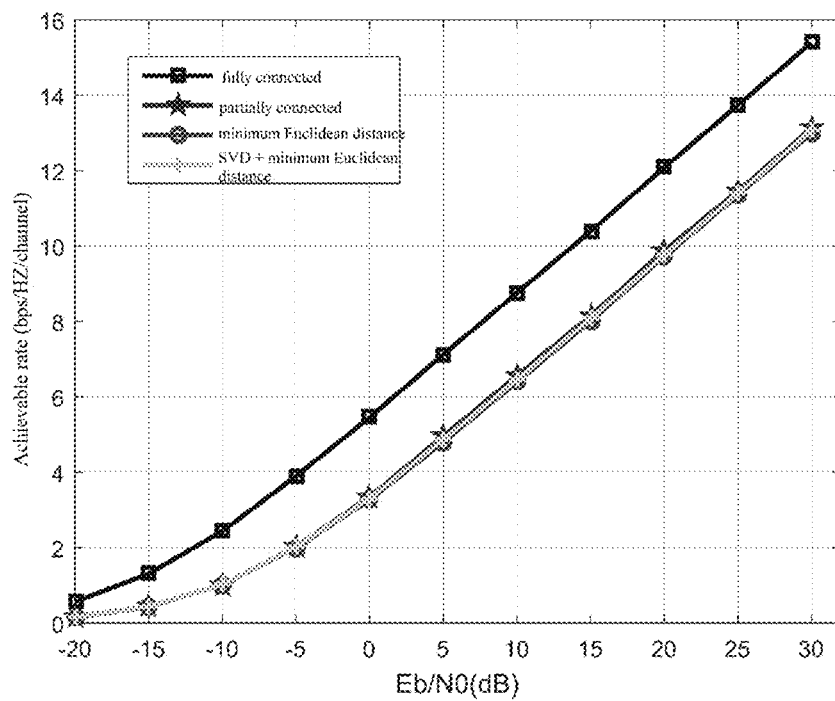
FIGS. 7A-7D are diagrams showing performance simulations of the electronic device according to an embodiment of the present disclosure.

FIGS. 7A to 7D depict a comparison of performances in various simulation scenarios. FIG. 7A corresponds to a case where the power consumption is not taken into account and the number of users K=4 (i.e., the number of radio links N=4), wherein the curve "fully connected" with squares corresponds to the fully connected architecture of the phased array antenna, the curve "partially connected" with stars corresponds to the partially connected architecture of the phased array antenna, the curve "minimum Euclidean distance" with circles corresponds to determining the analog precoding matrix by using the minimum Euclidean distance criterion in the fully radiated architecture of the reflective array antenna, the curve "SVD+minimum Euclidean distance" with vertical lines corresponds to determining the analog precoding matrix by using the SVD assisted minimum Euclidean distance criterion in the full radiating architecture of the reflective array antenna.

It is clear that with respect to the fully connected architecture and the partially connected architecture, the performance of the phased array antenna of the fully connected architecture is superior to that of the phased array antenna of the partially connected architecture, since for the former one, each of the antenna elements receives the electromagnetic wave signals of all RF link units and these signals are coupled to each other, the beamforming of the analog precoding is more flexible. When comparing the phased array antenna with the reflective array antenna of the present disclosure, if the power consumption is not taken into account, the performance of the reflective array antenna of the fully radiated architecture according to an embodiment of the present disclosure is at least equivalent to that of the phased array antenna of the partially connected architecture, but is slightly lower than that of the phased array antenna of the fully connected architecture.

The performance of the partial radiating architecture of the reflective array antenna is not shown here, since the model decides that the partial radiating architecture of the reflective array antenna may perfectly implement any precoding scheme of the partially connected architecture of the phased array antenna, so their performances are equivalent.

Figure 7B:
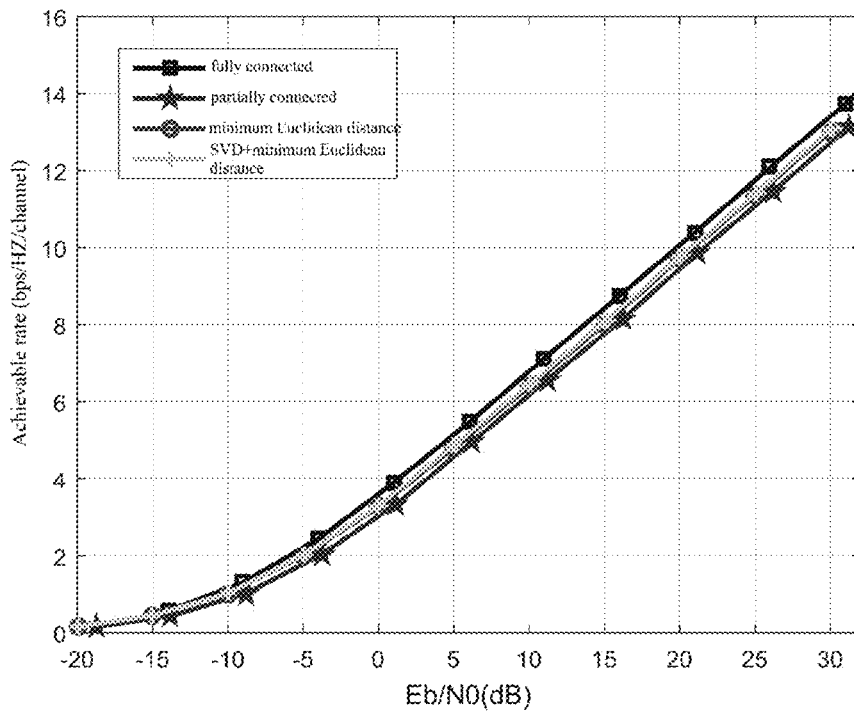

FIG. 7B is similar to FIG. 7A, but shows the case of taking the power consumption into account, it may be clearer that the performance of the reflective array antenna according to the embodiment of the present disclosure is even superior to that of the phased array antenna of the partially connected architecture, and is only slightly inferior and even close to the phased array antenna of the fully connected architecture. On the other hand, however, the reflective array antenna according to an embodiment of the present disclosure greatly reduces hardware complexity and power consumption while ensuring comparable performance.

Figure 7C:
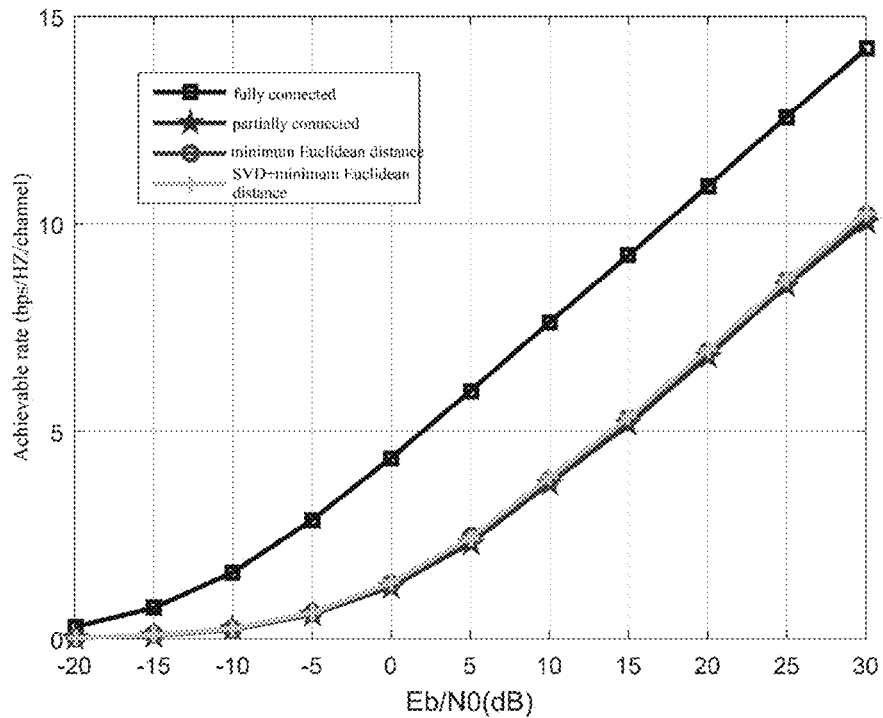
Figure 7D:
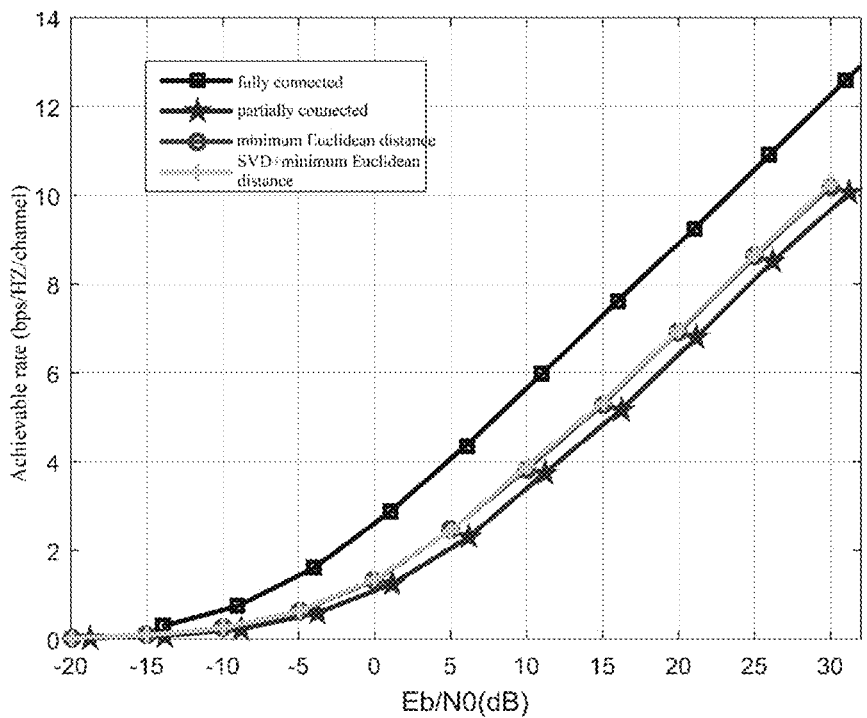

FIGS. 7C to 7D correspond to FIGS. 7A to 7B, only different in the number of users K=8 (ie, the number of radio link links N=8). It is clear from the figures that advantages similar to those of FIGS. 7A and 7B are also obtained.

Table 1 below is a list showing the hardware required for the conventional phased array antenna and the reflective array antenna according to an embodiment of the present disclosure.

TABLE 1

Comparison on hardware complexity (M is the number of antennas, N is the number of RF links)

| | Feeding network | Number of phase shifters | Number of combiners | Number of spitters |
|---|---|---|---|---|
| The phased array: fully connected | Need | M × N | M | N |
| The phased array: partialy connected | Need | M | 0 | N |
| Reflective array: fully radiated/ Reflective array: partialy radiated/ | No need | M | 0 | 0 |

As may be seen from the above table, in an electronic device including a multi-feeder reconfigurable reflective array antenna for performing the analog precoding according to an embodiment of the present disclosure, on one hand, the signal does not suffer from a significant power attenuation in the radiation of the order of the antenna array size, and on the other hand, even in the large-scale antenna array, the hardware complexity for construction of a transmission line and for use of phase shifters and/or combiners is not increase, while the cost of the feeding network is eliminated without combiners and splitters at the RF end, thereby further reducing the cost burden.

8. Extended Embodiment

Although various aspects of the embodiments of the present disclosure have been described above in a multi-user reception scenario, the present disclosure is not limited thereto.

In one embodiment, embodiments of the present disclosure may also be applied in a point-to-point transmission scenario. The difference between the multi-user reception scenario and the point-to-point transmission scenario lies in different operation modes at the receiving end, and the present disclosure researches the precoding at the transmitting end and does not involve the processing at the receiving end, and therefore the hybrid precoding architecture using the reflective array antenna according to an embodiment of the present disclosure is also applicable to the point-to-point transmission scenarios, for example, from a base station to another base station, or applicable to an extended application scenario such as a large vehicle-mounted or fixed terminal (such as a camera on a street) or the like, in which case multiple layers of data serve a single user device.

In another embodiment, the electronic device using the reflective array antenna of the present disclosure may also be used in many occasions, such as Massive MIMO, millimeter wave transmission, Active Antenna Array, etc.

In yet another embodiment, although the foregoing description relates to applications by the millimeter wave transmission, the present disclosure is not limited to millimeter wave applications, and may be applied to applications transmitted on other wavebands.

In another embodiment, when the active antenna array performs the analog precoding, both the phase and the amplitude of the electromagnetic wave signal may be adjusted according to a predetermined analog precoding matrix. This may be implemented by an amplitude modulation unit that performs amplitude adjustment and a phase shifter that performs phase shifting. The amplitude modulation unit and the phase shifter may be integrally formed as a single adjusting component or may be formed as two separate components. In an example, the amplitude modulation unit and the phase shifter are integrally formed on respective antenna element. In another example, the amplitude modulation unit, the phase shifter, and the corresponding antenna element are integrally formed into an antenna array element having amplitude modulation and phase shifting functions.

In another embodiment, as described above with respect to FIG. 2, the digital precoder 205 is depicted in a dashed box and may not be included in the electronic device 200. In fact, the digital precoder 205 is not necessary, as the present disclosure may even be performed without the digital precoding, in which case the antenna array is only used to transmit beams.

In yet another embodiment, although the above embodiments are described based on the multi-feeder reconfigurable reflective array antenna in which phase shifters are incorporated, the phase shifters may also be separated from the reflective array antenna.

9. Application Example of the Present Disclosure

The technology described in the present disclosure is applicable to various products. For example, the electronic device 200 according to an embodiment of the present disclosure may be stalled in various control devices, or the communication method according to an embodiment of the present disclosure may be implemented by various control devices.

The control device may be implemented as any type of base stations, preferably, such as a macro gNB or a small gNB in the NR (New Radio) access technology of the 3GPP 5G communication standard. The small gNB may be an gNB that covers a cell smaller than a macro cell, such as a pico gNB, a micro gNB, and a home (femto) gNB. Instead, the control device may be implemented as any other types of base stations such as a NodeB and a base transceiver station (BTS). The control device may include a main body (that is also referred to as a base station device) configured to control wireless communication, and one or more remote radio heads (RRH) disposed in a different place from the main body.

9-1. Application Examples of the Control Device

It will be appreciated that as used in the present disclosure, the term "base station" has an entire breadth in its generic sense, and includes at least the wireless communication station used as a portion of a wireless communication system or a radio system for purpose of communication. Examples of the base station may be for example but is not limited to the following: the base station may be either or both of the base transceiver station (BTS) and the base station controller (BSC) in the GSM system, may be either or both of the radio network controller (RNC) or NodeB in the WCDMA system, may be eNB in the LTE and LTE-Advanced system, or may be corresponding network nodes in future communication systems (for example, the gNB possibly appearing in the 5G communication system, or the like). In communication senarios such as D2D, M2M and V2V, a logical entity having a control function over the communication may be referred to a base station. In the scenario of cognitive radio communication, a logical entity having a function of frequency spectrum coordination may also be referred to a base station.

The First Application Example

Figure 8A:
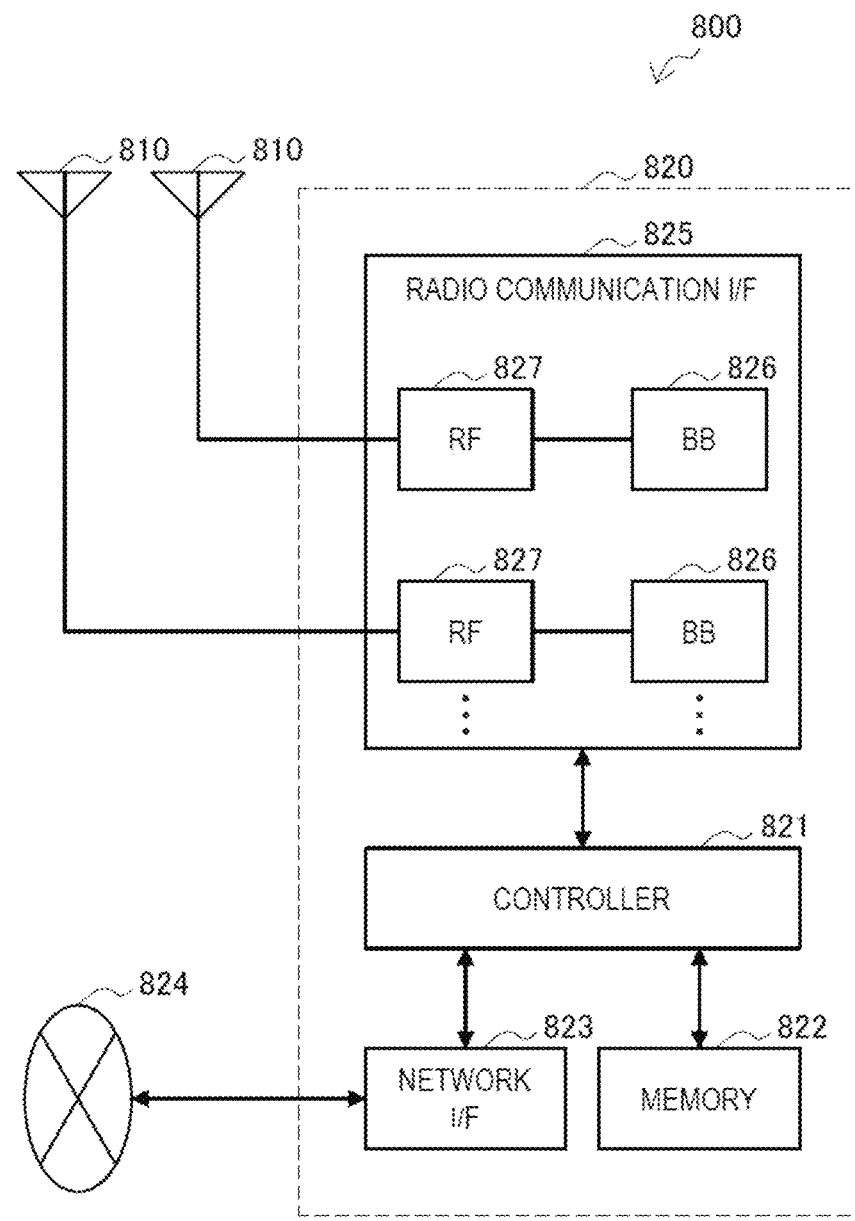
FIG. 8A is a block diagram showing a first example of a schematic configuration of a control device to which an embodiment of the present disclosure may be applied.

FIG. 8A is a block diagram illustrating a first example of a schematic configuration of the control device to which the technology described in the present disclosure may be applied. The control device may include for example the electronic device 200 for downlink transmission. In FIG. 8A, the control device is illustrated as an gNB 800. The gNB 800 includes a plurality of antennas 810 and a base station device 820. The base station device 820 and each antenna 810 may be connected with each other via a RF cable.

The antennas 810 may include one or more antenna arrays 203 as described with reference to FIG. 2, and the antenna array 203 includes multiple antenna elements (such as a plurality of antenna elements included in a Multiple Input and Multiple Output (MIMO) antenna), and is used for the base station 820 to transmit and receive radio signals. The gNB 800 may include multiple antennas 810, as illustrated in FIG. 8A. For example, the multiple antennas 810 may be compatible with multiple frequency bands used by the gNB 800. FIG. 8A illustrates the example in which the gNB 800 includes multiple antennas 810, and the antenna 810 may be implemented as the reflective array antenna according to an embodiment of the present disclosure.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 may include the processing circuitry 204 as described above, determine the analog precoding matrix and/or the digital precoding matrix according to the design method as described above, or control the components of the electronic device 200. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an gNB or a core network node in the vicinity. The memory 822 includes RAM and ROM, and stores a program that is executed by the controller 821, and various types of control data such as a terminal list, transmission power data, and scheduling data.

The network interface 823 is a communication interface for connecting the base station device 820 to a core network 824. The controller 821 may communicate with a core network node or another gNB via the network interface 823. In that case, the gNB 800, and the core network node or the other gNB may be connected to each other through a logical interface such as an S1 interface and an X2 interface. The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the gNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers such as L1, medium access control (MAC), radio link control (RLC), and a packet data convergence protocol (PDCP). The BB processor 826 may have a part or all of the above-described logical functions instead of the controller 821. The BB processor 826 may be a memory that stores a communication control program, or a module that includes a processor configured to execute the program and a related circuit. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 8A. For example, the multiple BB processors 826 may be compatible with multiple frequency bands used by the gNB 800. The radio communication interface 825 may include the multiple RF circuits 827, as illustrated in FIG. 8A. For example, the multiple RF circuits 827 may be compatible with multiple antenna elements. Although FIG. 8A illustrates the example in which the radio communication interface 825 includes the multiple BB processors 826 and the multiple RF circuits 827, the radio communication interface 825 may also include a single BB processor 826 or a single RF circuit 827.

In the gNB 800 illustrated in FIG. 8A, one or more of the components (for example, the components for determining the precoding matrices) included in the processing circuitry 204 described with reference to FIG. 2 may be implemented in the radio communication interface 825. Alternatively, at least a part of these components may be implemented in the controller 821. As an example, the gNB 800 includes a part (for example, the BB processor 826) or the entirety of the radio communication interface 825 and/or a module including the controller 821, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 800, and the radio communication interface 825 (for example, the BB processor 826) and/or the controller 821 may execute the program. As described above, as a device including the one or more components, the gNB 800, the base station device 820 or the module may be provided. In addition, a readable medium in which the program is recorded may be provided.

The Second Application Example

Figure 8B:
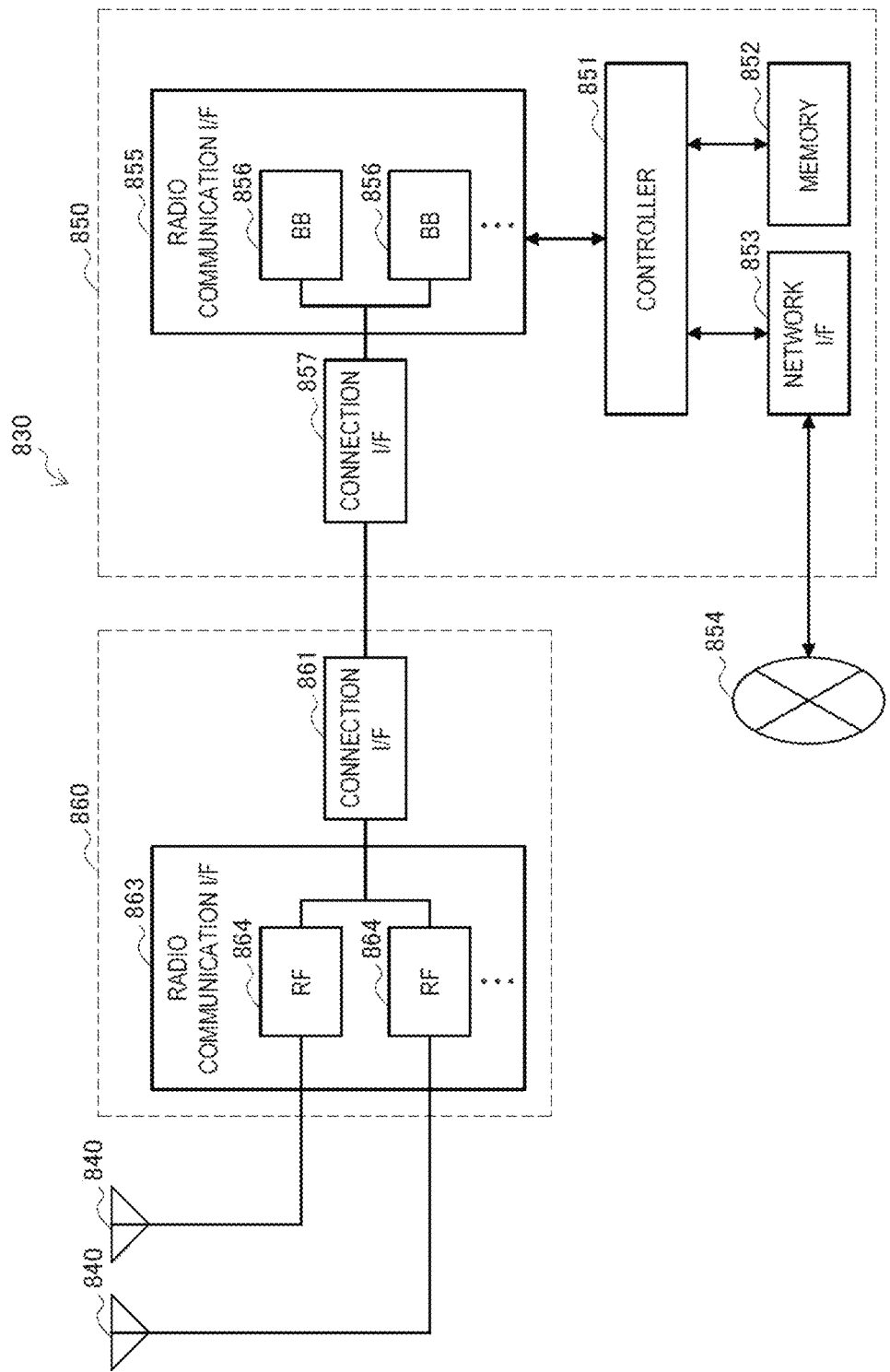
FIG. 8B is a schematic diagram showing a second example of a sexual configuration of a control device in which an embodiment of the present disclosure may be applied.

FIG. 8B is a block diagram illustrating a second example of a schematic configuration of the control device to which the technology of the present disclosure may be applied. The control device may include for example the electronic device 200 for downlink transmission. In FIG. 8B, the control device is illustrated as gNB 830. The gNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

The antennas 840 includes one or more antenna arrays 203 as described above, and the antenna array 203 includes multiple antenna elements such as multiple antenna elements included in a MIMO antenna and is used for the RRH 860 to transmit and receive radio signals. The gNB 830 may include multiple antennas 840, as illustrated in FIG. 8B. For example, multiple antennas 840 may be compatible with multiple frequency bands used by the gNB 830. FIG. 8B illustrates an example in which the gNB 830 includes multiple antennas 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 8A.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 8A, except the BB processor 856 is connected to the RF circuit 864 of the RRH 860 via the connection interface 857. The radio communication interface 855 may include the multiple BB processors 856, as illustrated in FIG. 8B. For example, multiple BB processors 856 may be compatible with multiple frequency bands used by the gNB 830. Although FIG. 8B illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 8B. For example, multiple RF circuits 864 may support multiple antenna elements. Although FIG. 8B illustrates the example in which the radio communication interface 863 includes the multiple RF circuits 864, the radio communication interface 863 may also include a single RF circuit 864.

In the gNB 830 illustrated in FIG. 8B, one or more of the components (for example, the components for determining the precoding matrices) of the processing circuitry 204 described with reference to FIG. 2 may be implemented in the radio communication interface 855. Alternatively, at least a part of these components may be implemented in the controller 851. As an example, the gNB 830 include a part (for example, the BB processor 856) or the entire of the radio communication interface 855 and/or a module including the controller 851, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 830, and the radio communication interface 855 (for example, the BB processor 856) and/or the controller 851 may execute the program. As described above, as a device including the one or more components, the gNB 830, the base station device 850 or the module may be provided, and a program allowing the processor to function as the one or more components may also be provided.

In addition, a readable medium in which the program is recorded may be provided. Therefore, the present disclosure also relates to a computer readable storage medium storing instructions thereon for implementing the above-mentioned communication method when loaded and executed by the processing circuitry 204.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device comprising:
    plural radio frequency (RF) link units, each of plural RF links configured to radiate a corresponding data stream in a form of a corresponding electromagnetic wave signal;
    processing circuitry configured to determine an analog precoding matrix;
    plural phase shifter groups, each phase shifter group having plural phase shifters, each of which for performing analog precoding on a corresponding one of the electromagnetic wave signals according to the determined analog precoding matrix, to generate plural analog-precoded signals,
    wherein the analog processing comprises determining a phase change of each of the electromagnetic wave signals upon its arrival at each of the plural antenna elements of the antenna array according to a distance between an electromagnetic wave radiating end corresponding to each data stream and the each of the plural antenna elements as well as a carrier frequency, so as to form a phase change matrix used to generate the plural analog-precoded signals, and
    an antenna array having plural antenna groups, each antenna group having plural antenna elements, each of the plural antenna elements configured to transmit a corresponding one of the analog precoded signals,
    wherein, for each of the electromagnetic wave signals, a number of the plural phase shifters of a corresponding phase shifter group is the same as a number of the plural antenna elements of a corresponding antenna group, and the plural phase shifters and the plural antenna elements are in one-to-one correspondence.

2. The electronic device according to claim 1, wherein the processing circuitry is further configured to determine the analog precoding matrix based on a channel matching rule for matching a channel response.

3. The electronic device according to claim 1, wherein the phase change matrix comprises a phase change matrix $F_{fp}$, wherein a phase change $[F_{fp}]_{i,k}$ upon an arrival of a kth radiated electromagnetic wave signal at an ith antenna element of the plural antenna elements of the antenna array is:

$$[F_{fp}]_{i,k} = \exp\left\{j \cdot 2\pi \frac{[L]_{i,k}}{\lambda}\right\}$$

where j is an imaginary unit, $[L]_{i,k}$ is a distance between an electromagnetic wave radiating end corresponding to the kth data steam and the ith antenna element, and $\lambda$ is a carrier wavelength of the kth electromagnetic wave signal;
determining the analog precoding matrix according to the phase change matrix $F_{fp}$ and a channel matrix H of a transmitting channel.

4. The electronic device according to claim 3, wherein the processing circuitry is further configured to calculate the analog precoding matrix based on a least Euclidean distance criteria for channel matching:

$$\Lambda^* = \underset{\Lambda}{\mathrm{argmin}} \|H^H - \Lambda Q\|_F^2$$

where $Q = F_{fp}$, $\Lambda^*$ is the optimal solution of the analog precoding matrix $\Lambda$, $H^H$ is a conjugate transposition matrix of the channel matrix H, and F is a type of norm.

5. The electronic device according to claim 4, wherein the processing circuitry is further configured to calculate the analog precoding matrix by using a constant modulus constraint based on the antenna array being a passive antenna array, which is radiated partially, from the following equation:

$$[\Lambda^*]_{i,i} = \frac{\exp\{-j \cdot L([H^H]_{i,k})\}}{[F_{fp}]_{i,k}}$$

where $[H^H]_{i,k}$ represents an element in the ith row and the kth column of the matrix $H^H$, k presents an ordinal number of the plural RF link units received by the ith antenna element, and $\angle([H^H]_{i,k})$ represents a function argumenting the complex number $[H^H]_{i,k}$.

6. The electronic device according to claim 4, wherein the processing circuitry is further configured to calculate the analog precoding matrix by using a constant modulus constraint based on the antenna array being a passive antenna array, which is fully radiated, from the following equation:

$$[\Lambda^*]_{i,i} = \frac{h_i^H q_i}{|h_i^H q_i|}$$

where $h_i$ is the ith column vector of the channel matrix H, and $q_i$ is a conjugate transposition of the ith row vector of matrix Q.

7. The electronic device according to claim 4, wherein the processing circuitry is further configured to calculate the analog precoding matrix based on the antenna array being an active antenna array, which is partially radiated, from the following equation:

$$[\Lambda^*]_{i,i} = \frac{\exp\{-j \cdot [H^H]_{i,k}\}}{[Q]_{i,k}}$$

where $[H^H]_{i,k}$ represents an element in the ith row and the kth column of the matrix $H^H$, and k represents an ordinal number of the plural RF link units received by the ith antenna element.

8. The electronic device according to claim 4, wherein the processing circuitry is further configured to calculate the analog precoding matrix based on the antenna array being an active antenna array, which is fully radiated, from the following equation:

$$[\Lambda^*]_{i,i} = \frac{h_i^H q_i}{|q_i^H q_i|}$$

where $h_i$ is the ith column vector of the channel matrix H, and $q_i$ is a conjugate transposition of the ith row vector of matrix Q.

9. The electronic device according to claim 3, wherein the processing circuitry is further configured to calculate the analog precoding matrix based on a singular value decomposition (SVD) assisted least Euclidean distance criteria for channel matching:

$$\Lambda^* = \underset{\Lambda}{\operatorname{argmin}} \|H^H - \Lambda Q\|_F^2$$

Where the matrix $F_{fp}$ is SVD decomposed by $F_{fp}=USV^H$, and let Q=US, $\Lambda^*$ is the optimal solution of the analog precoding matrix $\Lambda$, $H^H$ is a conjugate transposition matrix of the channel matrix H, and F is a type of norm.

10. The electronic device according to claim 1, wherein the processing circuitry is further configured to determine a digital precoding matrix W, and the electronic device further comprises a digital precoder which digitally precodes each data stream according to the determined digital precoding matrix W and then transmits a resultant digitally precoded data stream to the plural RF link units.

11. The electronic device according to claim 10, wherein the processing circuitry is further configured to obtain an equivalent channel according to a channel matrix of a transmitting channel, the phase change matrix and the determined analog precoding matrix, so as to determine the digital precoding matrix W.

12. The electronic device according to claim 11, wherein the processing circuitry is further configured to determine the digital precoding matrix W by considering a global power constraint and using zero-forcing criteria:

$$w=\tilde{H}^H(\tilde{H}\tilde{H}^H)^{-1}D$$

Wherein the global power constraint of the digital precoding matrix W is:

$$\|\Lambda FW\|_F^2=K$$

Where $F_{fp}$ is the phase change matrix and H is the channel matrix of the transmitting channel, $\tilde{H}=H\Lambda F_{fp}$ represents the equivalent channel, and D is a K-order diagonal matrix of transmitting power allocated to the electronic device.

13. The electronic device according to claim 1, wherein the processing circuitry is further configured such that a number (K) of the data streams, a number N of the plural RF link units and a number M of the plural antenna elements satisfy:

$$K \leq N \leq M.$$

14. The electronic device according to claim 1, wherein the plural RF link units that are uniformly arranged on a circle facing the antenna array.

15. The electronic device according to claim 14, wherein a distance f from a center of the circle to a plane of the antenna array satisfies $0.7D \leq f \leq 1.2D$, an angle θ between an axis of the circle and a normal line of the plane of the antenna array satisfies θ=0 or $15° \leq \theta \leq 25°$, the radius r of the circle satisfies $d \leq r \leq 0.5D$, D is width of the antenna array, and d is an average distance between the plural antenna elements.

16. The electronic device according to claim 1, wherein the plural phase shifters are included in the antenna array.

17. The electronic device according to claim 1, wherein the electronic device further comprises amplitude modulation units in one-to-one correspondence to the plural phase shifters, for changing an amplitude of corresponding ones of the electromagnetic wave signals according to the analog precoding matrix.

18. A communication method performed by an electronic device that includes plural radio frequency (RF) link units, processing circuitry, plural phase shifter groups, each phase shifter group having plural phase shifters and an antenna array having plural antenna groups, each antenna group having plural antenna elements, the method comprising:
  radiating, by each of the plural RF link units a data stream in a form of a corresponding electromagnetic wave signal;
  determining, by the processing circuitry, an analog precoding matrix;
  performing analog precoding, by each of the plural phase shifter groups, on a corresponding one of the electromagnetic wave signals according to the determined analog precoding matrix, to generate plural analog-precoded sign,
  wherein the analog precoding comprises determining a phase change of each of the electromagnetic wave signals upon its arrival at each of the plural antenna elements of the antenna array according to a distance between an electromagnetic wave radiating end corresponding to each data stream and each of the plural antenna elements as well as a carrier frequency, so as to form a phase change matrix used to generate the plural analog-precoded signals; and transmitting, by each of the plural antenna groups, a corresponding one of the analog-precoded signals, wherein, for each of the electromagnetic wave signals a number of the plural phase shifters of a corresponding phase shifter group is the same as a number of the plural antenna elements of a corresponding antenna group, and the plural phase shifters and the plural antenna elements are in one-to-one correspondence.

19. A tangible non-transitory computer readable storage medium storing instructions thereon for implementing the communication method according to claim 18 when loaded and executed by a processor.

* * * * *